(12) United States Patent
Matsunaga et al.

(10) Patent No.: US 9,375,903 B2
(45) Date of Patent: Jun. 28, 2016

(54) LAMINATED POLYESTER FILM AND HARDCOAT FILM

(75) Inventors: Atsushi Matsunaga, Gifu (JP); Tsutomu Kurihara, Gifu (JP); Motohiro Okochi, Gifu (JP)

(73) Assignee: Toray Industries, Inc. (JP)

( * ) Notice: Subject to any disclaimer, the term of this patent is extended or adjusted under 35 U.S.C. 154(b) by 498 days.

(21) Appl. No.: 13/979,759

(22) PCT Filed: Jan. 11, 2012

(86) PCT No.: PCT/JP2012/050382
§ 371 (c)(1),
(2), (4) Date: Jul. 22, 2013

(87) PCT Pub. No.: WO2012/098967
PCT Pub. Date: Jul. 26, 2012

(65) Prior Publication Data
US 2013/0302582 A1    Nov. 14, 2013

(30) Foreign Application Priority Data

Jan. 18, 2011 (JP) ................. 2011-007653

(51) Int. Cl.
*B32B 7/02* (2006.01)
*B32B 27/36* (2006.01)
*B32B 27/08* (2006.01)

(52) U.S. Cl.
CPC . *B32B 27/36* (2013.01); *B32B 7/02* (2013.01); *B32B 27/08* (2013.01); *B32B 2270/00* (2013.01); *B32B 2307/416* (2013.01); *B32B 2307/518* (2013.01); *B32B 2457/208* (2013.01); *Y10T 428/24983* (2015.01); *Y10T 428/31794* (2015.04)

(58) Field of Classification Search
CPC .................. B32B 2270/00; B32B 2307/416; B32B 2307/518; B32B 2457/208; B32B 27/08; B32B 27/36; B32B 7/02; Y10T 428/24983; Y10T 428/31794
USPC ........................................................ 428/212
See application file for complete search history.

(56) References Cited

U.S. PATENT DOCUMENTS

2009/0280333 A1* 11/2009 Kuwata ................. B32B 7/12
                                                                428/423.7
2011/0070416 A1*  3/2011 Nemoto ................ B32B 27/28
                                                                428/212

FOREIGN PATENT DOCUMENTS

| JP | 07-241969 A | 9/1995 |
| JP | 2005-335163 A | 12/2005 |
| JP | 2007-253512 A | 10/2007 |
| JP | 2009-220280 A | 10/2009 |
| JP | 2010-083029 A | 4/2010 |
| JP | 2010-103212 A | 5/2010 |
| JP | 2010-152331 A | 7/2010 |
| WO | 2008/099891 A1 | 8/2008 |
| WO | 2009/145075 A1 | 12/2009 |
| WO | 2010/143551 A1 | 12/2010 |

* cited by examiner

*Primary Examiner* — Bijan Ahvazi
*Assistant Examiner* — Lawrence Ferguson
(74) *Attorney, Agent, or Firm* — DLA Piper LLP (US)

(57) ABSTRACT

A layered polyester film includes a substrate polyester film with at least one surface laminated with a lamination layer including a polyester resin as a primary component, the surface of the lamination layer having a wetting tension of 35-45 mN/m and the polyester resin contained in the lamination layer meeting (a) to (c): (a) the lamination layer contains polyesters (A) having a glass transition temperature (Tg) of 110-140° C. and polyesters (B) having a glass transition temperature (Tg) of 40-90° C., (b) at least either polyesters (A) or polyesters (B) contains both a monomer having a sulfonic acid component and a monomer having a tri or higher-valent, carboxylic acid component, and (c) the mixing ratio between polyesters (A) and polyesters (B) is 10/90 to 60/40.

9 Claims, 2 Drawing Sheets

LAMINATED POLYESTER FILM AND HARDCOAT FILM

TECHNICAL FIELD

This disclosure relates to laminated polyester film with good adhesive characteristics, particularly to laminated polyester film that can serve as base material for hard coat film intended for touch panel production and in-mold decoration because strong initial adhesion and moisture resistant adhesion to the hard coat layer can be achieved and interference fringes are suppressed to ensure good appearance, and also relates to such hard coats. More specifically, it relates to laminated polyester film that can achieve strong versatile adhesion to hard coat layers that have various functions such as UV absorption and antifouling, and also relates to such hard coats.

BACKGROUND

With good mechanical characteristics, electric properties, dimensional stability, heat resistance, transparency, and chemical resistance, polyester films have been used in a variety of fields including various industry materials, packaging materials, and magnetic materials. Hard coat films with improved scratch resistance and wear resistant produced by forming a hard coat layer over the surface of a polyester film to increase its surface hardness and abrasion resistance in recent years have been in greater demand in the market to meet the increasing production of their intended applications including surface protective films and reflection films in flat panel displays such as liquid crystal display and plasma display as well as touch panel, display board, name plate, window covering, and surface decorating material, and demands for them are expected to continue growing in the future.

Such polyester films with a hard coat layer can be produced by laminating a polyester base film with a hard coat layer. However, polyester base films directly coated with a hard coat layer have some problems including poor adhesion and interference fringes resulting from a difference in refractive index between the hard coat layer and the polyester base film to degrade their appearance, and studies have been made to solve this problem by forming a thin film with specific constitution to cover the polyester base film. (Japanese Unexamined Patent Publication (Kokai) No. 2007-253512 and WO 2009/145075)

For hard coat films used in the latest mobile devices, in particular, hard coat layers of various designs with a high degree of multifunctionality have been developed to suit different applications. For example, some hard coat layers contain an ultraviolet absorber to prevent color degradation from being caused by ultraviolet rays (Japanese Unexamined Patent Publication (Kokai) Nos. 2005-335163 and 2010-083029), some having an antifouling function to prevent dirt from being attached (Japanese Unexamined Patent Publication (Kokai) No. 2010-152331), and some having a moldability to fit to the shapes of members (Japanese Unexamined Patent Publication (Koaki) No. 2009-220280). As described above, as hard coat layers are diversified, there is an increased need for a variety of lamination layers to achieve strong versatile adhesion between polyester base films and a wide range of hard coat layers of different designs, but conventional techniques have only a limited adhesion capability and require a modified lamination layer to suite the design of a particular hard coat layer. This can result in decreased productivity and increased cost, or in some cases, it is necessary to make modifications to a hard coat layer even if they may cause deterioration in its functionality. In cases where ultraviolet absorptivity is required, a large amount of an ultraviolet absorbent has to be added to a thin hard coat layer, but it can cause a noticeable decrease in adhesiveness, leading to the problem of failure in maintaining adequate performance. In addition to improving the normal initial adhesive strength, furthermore, a high degree of durability is also required to maintain a high adhesive strength in an high-temperature, high-humidity environment, and there is a call for a polyester film that has both these properties as well as high adhesive strength.

It could therefore be helpful to provide laminated polyester film that can maintain versatile and durable adhesion to various hard coat layers with different functions including ultraviolet absorption, and further serves to develop good appearance with suppressed interference fringes.

SUMMARY

We thus provide:
(1) Laminated polyester film including a polyester base film (layer S) with at least one surface being laminated with a lamination layer (layer C) containing a polyester resin as primary component, the surface of the lamination layer (layer C) having a wetting tension of 35 to 45 mN/m, and the polyester resins contained in the lamination layer (layer C) meeting requirements (a) to (c):
(a) the lamination layer (layer C) contains polyesters (A) with glass transition temperatures (Tg) of 110 to 140° C. and polyesters (B) with glass transition temperatures (Tg) of 40 to 90° C.,
(b) at least either polyesters (A) or polyesters (B) contain both a monomer having a sulfonic acid component and a monomer having a multivalent, i.e., tri- or higher-valent, carboxylic acid component, and
(c) the mixing ratio between polyesters (A) and polyesters (B) is 10/90 to 60/40.
(2) Laminated polyester film including a polyester base film (layer S) with at least one surface being laminated with a lamination layer (layer C) containing a polyester resin as primary component, the polyester resin in the lamination layer (layer C) containing a monomer with a sulfonic acid component, the surface of the lamination layer (layer C) having a wetting tension of 35 to 45 mN/m, and time-of-flight secondary ion mass spectrometry (TOF-SIMS) of the surface of the lamination layer (layer C) giving normalized intensities in the ranges specified below for the undermentioned secondary ion peak species:
$CHO_2^-$: $0.3 \times 10^{-2}$ or more and $1.5 \times 10^{-2}$ or less
$SO_3^-$: $0.2 \times 10^{-2}$ or more and $2.0 \times 10^{-2}$ or less.
(3) Laminated polyester film as defined in either (1) or (2) wherein:
the polyesters contained in the lamination layer (layer C) include of polyesters (A) with glass transition temperatures (Tg) of 110 to 140° C. and polyesters (B) with glass transition temperatures (Tg) of 40 to 90° C.,
either polyesters (A) and polyesters (B) contain a monomer having a sulfonic acid component and a monomer having a multivalent, i.e., tri- or higher-valent, carboxylic acid component, and
equations (d) to (g) below are satisfied, where SA (parts by mole) represents the content of the monomers having a sulfonic acid component while CA (parts by mole) represents the content of the monomers having a multivalent, i.e., tri- or higher-valent, morecarboxylic acid component, relative to the total quantity, which accounts for 100 parts by mole, of all the monomer components contained in polyesters (A), whereas SB (parts by mole) represents the content of the monomers having a sulfonic acid component while CB (parts by mole) represents the content of the monomers having a multivalent, i.e., tri- or higher-valent, morecarboxylic acid component, relative to the total quantity, which accounts for 100 parts by mole, of all the monomer components contained in polyesters (B).

$$1 \leq SA \leq 10 \quad \text{equation (d)}$$

$$1 \leq SB \leq 10 \quad \text{equation (e)}$$

$$1 \leq CA \leq 10 \quad \text{equation (f)}$$

$$1 \leq CB \leq 10 \quad \text{equation (g)}$$

(4) Laminated polyester film as defined in any one of (1) to (3) wherein the lamination layer (layer C) contains a melamine based and/or an oxazoline based crosslinking agent, the crosslinking agent accounting for 20 to 80 parts by weight relative to the total weight, which accounts for 100 parts by weight, of the polyester resins.

(5) Laminated polyester film as defined in any one of (1) to (4) wherein the lamination layer (layer C) contains an acrylic resin, the an acrylic resin accounting for 5 to 30 parts by weight relative to the total weight, which accounts for 100 parts by weight, of the polyester resins.

(6) Laminated polyester film as defined in any one of (1) to (5) wherein there exists a wavelength λmin in the range of 500 to 600 nm at which a spectral reflectance curve given by the lamination layer (layer C) surface shows a minimum, the reflectance at min, which is represented as Rmin, being 4.0 to 6.0%.

(7) Hard coat film comprising laminated polyester film as defined in any one of (1) to (6) with its lamination layer (layer C) being laminated with a hard coat layer.

(8) A laminated polyester film production method comprising a step of melting polyester resin and molding it into a sheet, a step of biaxially stretching it in the length direction and in the width direction, and a step of laminating at least either of its surfaces with a lamination film, the aforementioned step of the laminating with a lamination film including a step of coating at least either of the surfaces of the polyester base film (layer S) with a resin composition as specified below to laminate it with a resin layer:

a resin composition containing at least polyesters (A) with glass transition temperatures (Tg) of 110 to 140° C. and polyesters (B) with glass transition temperatures (Tg) of 40 to 90° C.; at least either polyesters (A) or polyesters (B) containing both a monomer having a sulfonic acid component and a monomer having a multivalent, i.e., tri- or higher-valent, carboxylic acid component; and the weight ratio between polyesters (A) and polyesters (B) being 10/90 to 60/40.

(9) A laminated polyester film production method as defined in (8) wherein the resin composition meets the requirement specified below:

equations (d) to (g) below are satisfied, where SA (mol %) represents the content of the monomers having a sulfonic acid group while CA (mol %) represents the content of the monomers having a multivalent, i.e., tri- or higher-valent, carboxylic acid group, relative to the total content, which accounts for 100 mol %, of all the monomer components contained in polyesters (A), whereas SB (mol %) represents the content of the monomers having a sulfonic acid group while CB (mol %) represents the content of the monomers having a multivalent, i.e., tri- or higher-valent, carboxylic acid group, relative to the total content, which accounts for 100 mol %, of all the monomer components contained in polyesters (B).

$$1 \leq SA \leq 10 \quad \text{equation (d)}$$

$$1 \leq SB \leq 10 \quad \text{equation (e)}$$

$$1 \leq CA \leq 10 \quad \text{equation (f)}$$

$$1 \leq CB \leq 10 \quad \text{equation (g).}$$

(10) A laminated polyester film production method as defined in either (8) or (9) wherein the resin composition meets the requirement specified below:

the resin composition further contains a melamine based and/or oxazoline based compound, the compound accounting for 20 wt % to 80 wt % relative to the total weight, which accounts for 100 wt %, of the polyester resins.

(11) A laminated polyester film production method as defined in any of (8) to (10) wherein the resin composition meets the requirement specified below:

the resin composition further contains an acrylic resin, the acrylic resin accounting for 5 wt % to 30 wt % relative to the total weight, which accounts for 100 wt %, of the polyester resins.

Our laminated polyester films have versatile and durable adhesion to hard coat layers of various designs and produce good appearance characteristics with suppressed interference fringes when used as base material of hard coats for surface protective films and reflection films in flat panel displays such as liquid crystal display and plasma display as well as touch panel, display board, name plate, window covering, and surface decorating material.

EXPLANATION OF NUMERALS

Figure 1:
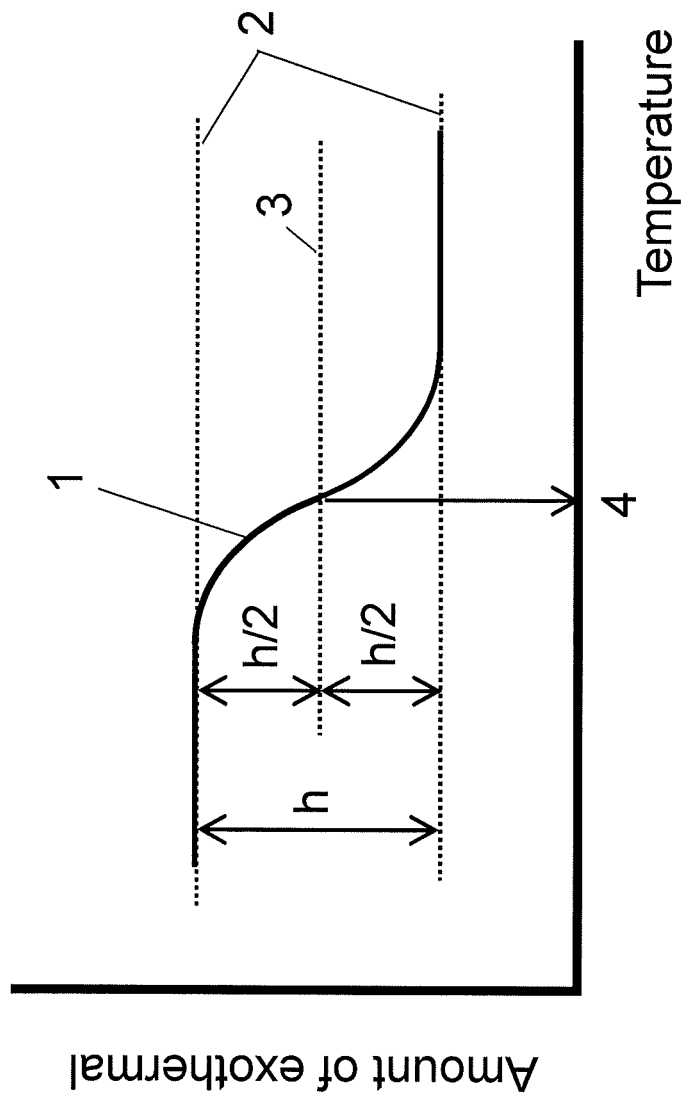
FIG. 1 is a schematic diagram showing a DSC curve.
Figure 2:
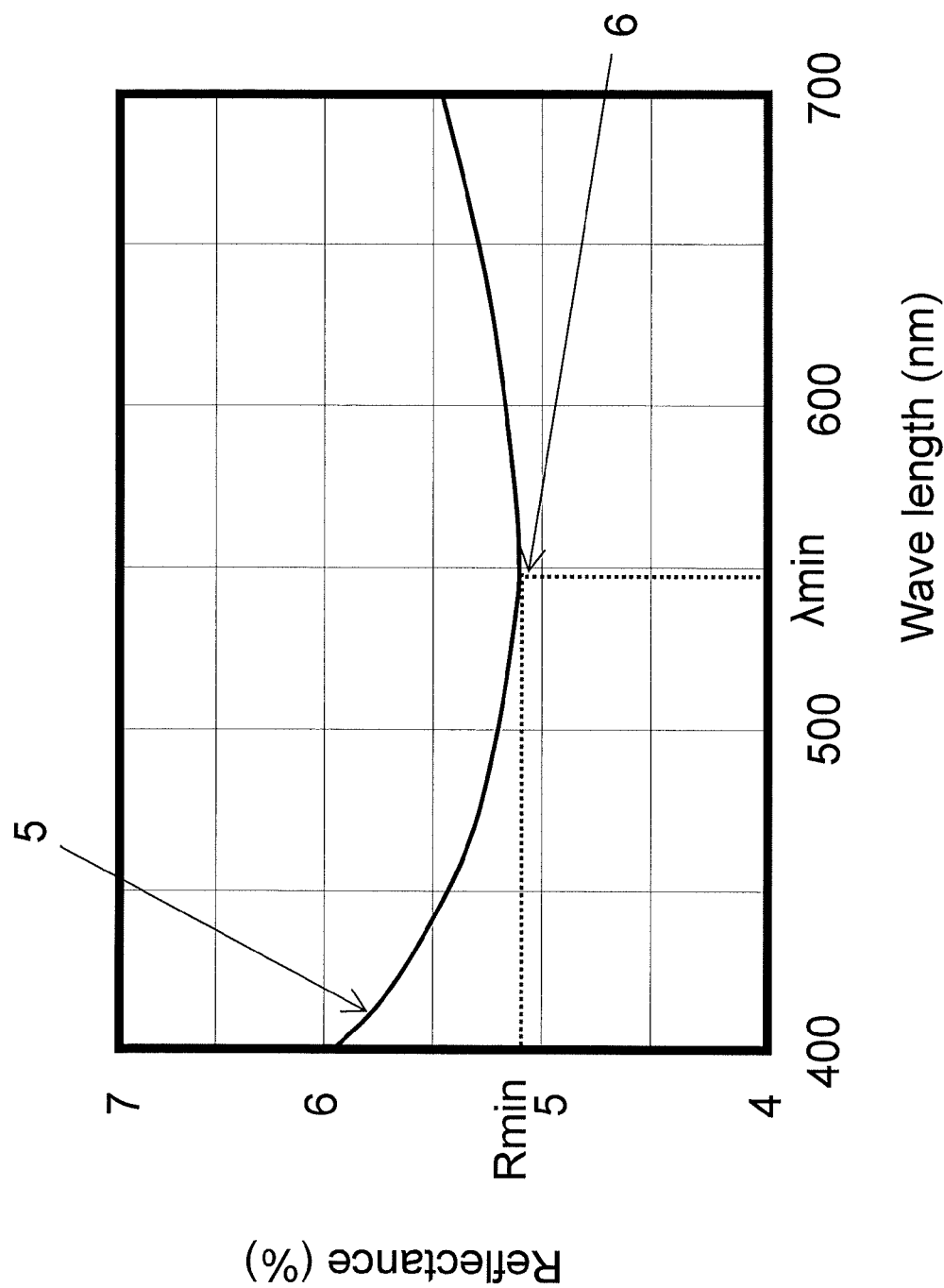
FIG. 2 is a typical reflectance curve from the lamination layer (layer C) of a laminated polyester film.

1. DSC curve
2. extended line
3. center line
4. glass transition temperature (Tg)
5. reflectance curve of lamination layer (layer C) surface
6. minimum reflectance

DETAILED DESCRIPTION

It is necessary for at least either surface of the polyester base film (layer S) to be laminated with a lamination layer (layer C). In the case where the lamination layer (layer C) is absent, there will be a lack of sufficient adhesiveness to the function layer, such as hard coat, formed on the film.

Our laminated polyester films have versatile and durable adhesion to hard coat layers of different designs, and the surface of the lamination layer (layer C), as an indicator, exhibits a wet-heat-resistant adhesion index of 3 or more and 5 or less for adhesion between the lamination layer (layer C) and a hard coat layer containing an ultraviolet absorber. The adoption of a lamination layer (layer C) that contains a polyester resin as primary component will make it possible to develop a high adhesive strength to a hard coat layer and ensure good appearance with suppressed interference fringes after the lamination with the hard coat layer. In particular, it is necessary for the lamination layer (layer C) to develop highly durable adhesion to a wide variety of hard coat layers, and in some cases, it is required to obtain high adhesive strength evaluations in a test for wet-heat resistant adhesion to a hard coat layer containing an ultraviolet absorber, which is extremely unlikely to develop strong adhesion. A wet-heat-resistant adhesion index of less than 3 will result in an insufficient adhesive strength to a hard coat layer. The method used to evaluate the wet-heat-resistant adhesion index for adhesion to a hard coat layer containing an ultraviolet absorber is described in paragraph 4 (A) under "Methods for measurement of properties" in the Examples section. A wet-heat-resistant adhesion index in the above range can be achieved favorably by, for instance, adopting a lamination layer (layer C) having a constitution as described below.

It is necessary for the polyester resin existing in the lamination layer (layer C) to contain a monomer having a sulfonic acid component (a sulfonic acid group and/or a salt thereof). To increase the adhesive strength to a hard coat layer and also allow a uniform, thin lamination film to be formed during the production of the lamination layer (layer C), it is necessary for the polyester resin to be water-soluble or highly water-dispersible, and it is in turn necessary for the polyester resin layer to contain a monomer having a sulfonic acid component. The existence of a sulfonic acid component in the polyester resin serves to increase its hydrophilicity, and in particular, effectively improve the initial adhesive strength to the hard coat layer.

The surface of the lamination layer (layer C) has a wetting tension of 35 to 45 mN/m, preferably 36 to 43 mN/m. If the wetting tension is more than 45 mN/m, the polyester resin component of the lamination layer (layer C) may contain an excessive number of hydrophilic groups, and accordingly, may be easily affected by humidity, possibly leading to a decreased durability of the adhesion, or specifically, a low wet-heat resistant adhesiveness. If the wetting tension is less than 35 mN/m, on the other hand, the number of hydrophilic groups will be too small, possibly leading to a decrease in the adhesive strength or failure in obtaining a uniform lamination f layer (layer C). There are no specific limitations on the method to be used to adjust the wetting tension to the above range, but such a wetting tension can be achieved favorably by, for instance, controlling the content of the sulfonic acid component or the content of the multivalent, i.e., tri- or higher-valent, carboxylic acid component described below contained in the lamination layer (layer C).

The lamination layer (layer C) preferably contains a multivalent, i.e., tri- or higher-valent, carboxylic acid component to ensure both a required adhesive strength to the hard coat layer and uniformity of the lamination layer (layer C). We believe that the sulfonic acid component existing in the polyester resin constituting the lamination layer (layer C) works particularly effectively to improve the initial adhesive strength to the hard coat layer as described above, but the durability of the adhesion (wet-heat resistant adhesiveness) tends to be slightly poor. As compared to the sulfonic acid component, on the other hand, the carboxylic acid component is not significantly contributable to improving the initial adhesive strength, but the adhesion will be durable. To achieve both a required initial adhesiveness and wet-heat resistant adhesiveness to the hard coat layer and obtain a uniform lamination film, as well as assume the role of making the resin hydrophilic to ensure uniformity of the lamination layer (layer C), it is preferable that a monomer having a multivalent, i.e., tri- or higher-valent, carboxylic acid component is also contained in addition to the monomer having a sulfonic acid component. The monomer having a sulfonic acid component and the monomer having a multivalent, i.e., tri- or higher-valent, carboxylic acid component that are contained in the polyester resins constituting the lamination layer (layer C) may be contained separately in two or more different polyester resins. Elements contained in the lamination layer (layer C) and information on their bonding can be detected directly by electron spectroscopy for chemical analysis (ESCA) and time-of-flight secondary ion mass spectrometry (TOF-SIMS), and the sulfonic acid component and carboxylic acid component that can be analyzed quantitatively from their results. By time-of-flight secondary ion mass spectrometry (TOF-SIMS), for instance, the quantities of the carboxylic acid group and sulfonic acid group contained in the lamination layer (layer C) can be analyzed based on the secondary ion peak intensities of $CHO_2^-$ (m/z: 45.00) originating from the carboxylic acid group and $SO_3^-$ (m/z: 79.96) originating from the sulfonic acid group deter-mined by the method described in paragraph 7 under "Methods for measurement of properties" in the Examples section. Their normalized values are preferably $0.30 \times 10^{-2}$ to $1.50 \times 10^{-2}$, more preferably $0.40 \times 10^{-2}$ to $1.00 \times 10^{-2}$, for $CHO_2^-$, and $0.20 \times 10^{-2}$ to $2.00 \times 10^{-2}$, more preferably $0.50 \times 10^{-2}$ to $1.50 \times 10^{-2}$, for $SO_3^-$. The above ranges are preferable because both a required initial adhesiveness and wet-heat resistant adhesiveness are achieved when they in the ranges.

It is preferable that the lamination layer (layer C) contain polyesters (A) with glass transition temperatures (Tg) of 110 to 140° C. and polyesters (B) with glass transition temperatures (Tg) of 40 to 90° C., and that the ratio between polyesters (A) and polyesters (B) be 10/90 to 60/40. Polyesters (A) are relatively high in glass transition temperature (Tg), and we believe that the existence of polyesters (A) serves to reduce the fluctuation of molecular structures in a high-temperature, high-humidity environment, and thereby improve the durability of the adhesion, specifically the wet-heat resistant adhesiveness. The wet-heat resistant adhesiveness (durability of adhesion) may be low when polyesters (A) are not contained or the ratio is less than 10/90. It is considered, on the other hand, that polyesters (B) have high molecular motilities because they are relatively low in glass transition temperature (Tg), and that the existence of polyesters (B) acts to develop versatile adhesion for a wide variety of hard coat layers and improve the initial adhesive strength. The initial adhesiveness can be low when polyesters (B) are not contained or the ratio of polyesters (B) is less than 60/40. The polyester resin that falls under polyesters (A) or polyesters (B) may be a single polyester resin or a mixture of a plurality of polyester resins, and it is preferable that each group of polyesters have a weight ratio in the above range.

Polyesters (A) preferably have glass transition temperatures (Tg) of 110 to 140° C., preferably 120 to 140° C. The wet-heat resistant adhesiveness to the hard coat layer (durability of adhesion) will be low when the glass transition temperature (Tg) is less than 110° C., whereas the initial adhesive strength to the hard coat layer will tends to be low and the resin itself will tends to be stiff, leading to a decrease in water dispersion and deterioration in the appearance of the lamination layer (layer C), when the glass transition temperature (Tg) is more than 140° C. Furthermore, polyesters (B) preferably have glass transition temperatures (Tg) of 40 to 90° C., preferably 50 to 85° C. The wet-heat resistant adhesiveness to the hard coat layer (durability of adhesion) can be low when the glass transition temperature (Tg) is less than 40° C., whereas the initial adhesive strength to the hard coat layer will tends to be low when the glass transition temperature (Tg) is more than 90° C. The glass transition temperature (Tg) of a polyester resin can be adjusted by selecting an appropriate combination of monomer components, which will be described in detail later, that constitute the polyester resin and controlling their molecular weights. Specifically, the glass transition temperature (Tg) will increase if the polyesters contain rigid components that have a benzene backbone, naphthalene backbone, fluorene backbone, or the like, whereas the glass transition temperature (Tg) will decrease if they contain aliphatic components with relatively long molecular chains such as alkylene glycol and, for instance, neopentyl glycol. To obtain a resin with a relatively high glass transition temperature (Tg), such as polyesters (A), it is preferable for the resin to contain rigid components such as naphthalene backbone and fluorene backbone, in its molecules, and a favorable resin can be prepared by controlling their content to 30 to 80 parts by mole of the total quantity of the monomer components in the polyester resin. Polyesters (B), on the other hand, preferably contain a monomer component with a benzene ring in their molecules, and the functional groups (specifically carboxyl group and/or hydroxyl group) contributing to the ester bonds are preferably located at the para-position of the benzene ring. They can be prepared favorably by adjusting the content of the monomers having a benzene ring to 30 to 50 parts by mole of the total quantity of the monomer components in the polyester resin.

The polyester resin that falls under polyesters (A) preferably contains, as its constituents, a monomer having a sulfonic acid component and a monomer having a multivalent, i.e., tri- or higher-valent, carboxylic acid component. Furthermore, the content (SA (parts by mole)) of the monomer having a sulfonic acid component is preferably 1 to 10 parts by mole, more preferably 3 to 5 parts by mole, of the total quantity, accounting for 100 parts by mole, of the monomer components that constitute polyesters (A). The content (CA (parts by mole)) of the monomer having a multivalent, i.e., tri- or higher-valent, carboxylic acid component is preferably 1 to 10 parts by mole, more preferably 3 to 8 parts by mole. Similarly, the polyester resin that falls under polyester resins (B) preferably contains, as its constituents, a monomer having a sulfonic acid component and a monomer having a multivalent, i.e., tri- or higher-valent, carboxylic acid component. Furthermore, the content (SB (parts by mole)) of the monomer having a sulfonic acid component is preferably 1 to 10 parts by mole, more preferably 3 to 5 parts by mole, of the total quantity, accounting for 100 parts by mole, of the monomer components that constitute polyesters (B). The content (CB (parts by mole)) of the monomer having a multivalent, i.e., tri- or higher-valent, carboxylic acid component is preferably 1 to 10 parts by mole, more preferably 3 to 8 parts by mole. A laminated polyester film having versatile initial adhesion to hard coat layers and wet-heat resistant adhesiveness (durability of adhesion) in a good balance can be obtained and a moisture resistant adhesion to a hard coat layer containing an ultraviolet absorber can be favorably adjusted to 3 or more and 5 or less if at least either of the two groups of polyesters with different glass transition temperatures, i.e., polyesters (A) and polyesters (B), that constitute the lamination layer (layer C) contain both a monomer having a sulfonic acid component and a monomer having a multivalent, i.e., tri- or higher-valent, carboxylic acid component, with their quantities controlled in the above ranges. Furthermore, a laminated polyester film having versatile initial adhesion to a hard coat layer and wet-heat resistant adhesiveness (durability of adhesion) in a good balance can be obtained if both of the two groups of polyesters with different glass transition temperatures, i.e., polyesters (A) and polyesters (B), contain a monomer having a sulfonic acid component and a monomer having a multivalent, i.e., tri- or higher-valent, carboxylic acid component, with their quantities controlled in the above ranges.

In particular, polyesters (B) can develop versatile, strong initial adhesion if they contain a monomer having a sulfonic acid component, but the wet-heat resistant adhesiveness (durability of adhesion) will decrease if the content of the sulfonic acid component is too large, and therefore, they preferably contain an appropriate quantity of a carboxylic acid component having high wet-heat resistant adhesiveness (durability of adhesion). Polyesters (A) also can develop wet-heat resistant adhesiveness (durability of adhesion) if they contain a carboxylic acid, but in some cases, a carboxylic acid component alone cannot successfully develop a sufficient degree of wet-heat resistant adhesiveness (durability of adhesion). This is believed to be because the sulfonic acid component contained in polyesters (A) contributes to allowing the carboxylic acid component to serve for developing highly durable adhesion in the initial stage of adhesion to the hard coat layer. The use of a carboxylic acid component alone may fail to allow polyesters (A) having relatively high glass transition temperatures (Tg) to be sufficiently water-soluble or water-dispersible, and therefore, it is preferable that a moderate amount of a sulfonic acid component be contained. The monomer having a sulfonic acid component and the monomer having a multivalent, i.e., tri- or higher-valent, carboxylic acid component that are contained in polyesters (A) and/or polyesters (B) may be contained separately in two or more different polyester resins belonging to either group of polyesters, and it is preferable that their total contents in the group of polyester resins are in the above ranges.

The lamination layer (layer C) is preferably designed so that the reflected light at the interface between the hard coat layer and the laminated polyester film reaches a minimum in the visible light region. The interference fringes taking place on the hard coat film are attributed to interference between the reflected light from the air/hard coat layer interface and that from the hard coat layer/film layer interface, and accordingly, the interference fringes can be suppressed by minimizing the reflected light from the hard coat layer/film layer interface. To develop these characteristics, the lamination layer (layer C) surface of the laminated polyester film preferably has a spectral reflectance curve that reaches a minimum at a wavelength, $\lambda$min, of 500 to 600 nm, more preferably 530 nm to 570 nm. Interference fringes will not be significantly visible, as desired, if wavelength $\lambda$min is 500 to 600 nm, which represents a central portion of the visible light region, while they become significant as the wavelength shifts out of the range. At wavelength $\lambda$min where the reflectance reaches a minimum, the reflected light from the air layer/lamination layer (layer C) interface and that from the lamination layer (layer C)/polyester base film (layer S) interface are considered to be in the opposite phases and cancelling each other, and the above requirement is met by controlling the constitution and thickness of the lamination layer (layer C) so that the difference in optical path length between the two lights (thickness of adhesion×2×refractive index of adhesion layer) is equal to a half of a wavelength in the range of 500 to 600 nm. The constitution of the lamination film will be described in detail later.

Furthermore, the reflectance, Rmin, at wavelength $\lambda$min where the spectral reflectance on the lamination layer (layer C) surface reaches a minimum is preferably 4.0% or more and 6.0% or less, more preferably 4.8% or more and 5.3% or less.

Serious interference fringes can take place if reflectance Rmin is out of the aforementioned range. The difference in refractive index between the polyester base film (layer S) adjacent to the lamination layer (layer C) and the hard coat layer formed on the lamination layer (layer C) is preferably small to reduce the reflectance at the hard coat layer/lamination layer (layer C) interface and that at the lamination layer (layer C)/polyester base film (layer S) interface. The difference in reflectance between them is preferably small to prevent the reflected light from being reduced by interference. A typical hard coat layer has a refractive index of 1.45 to 1.55 while a typical polyester base film (layer S) has a refractive index of 1.60 to 1.70, and it is necessary for reflectance Rmin of the lamination layer (layer C) surface in the laminated polyester film to be in the aforementioned range to allow the aforementioned interference fringes to be in a good state. These requirements can be met by controlling the refractive index of the lamination layer (layer C). The constitution of the lamination film will be described in detail later.

The polyester resin contained in the lamination layer (layer C) is a polyester resin having an ester bond in its backbone chain or side chain and can be produced by either method I) or II) described below. Alternatively, methods I) and II) may be carried out in combination (a dicarboxylic acid component, glycol component, and a component having one or more alcoholic functional groups (hydroxyl groups) and one or more carboxyl groups are used as constituents and subjected to condensation polymerization reaction).

I) A dicarboxylic acid component and a glycol component are used as constituents and subjected to condensation polymerization reaction.

II) A component having one or more alcoholic functional groups (hydroxyl groups) and one or more carboxyl groups are used as constituents and subjected to condensation polymerization reaction.

There are no specific limitations on the monomer components to be used to constitute the polyester resin contained in the lamination layer (layer C), and usable ones include aromatic, aliphatic, or alicyclic dicarboxylic acid and glycol components as listed below. Usable dicarboxylic acid components include terephthalic acid, isophthalic acid, orthophthalic acid, phthalic acid, 2,5-dimethyl terephthalic acid, biphenyl dicarboxylic acid, 1,2-bisphenoxy ethane-p,p'-dicarboxylic acid, and phenylindane dicarboxylic acid. Usable aliphatic and alicyclic dicarboxylic acids include, but not limited to, succinic acid, adipic acid, sebacic acid, dodecanedioic acid, dimer acid, 1,3-cyclopentane dicarboxylic acid, 1,2-cyclohexanedicarboxylic acid, 1,4-cyclohexanedicarboxylic acid, and ester-forming derivatives thereof. Usable glycol components include, but not limited to, ethylene glycol, diethylene glycol, polyethylene glycol, propylene glycol, polypropylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diols, neopentyl glycol, 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexane dimethanol, 1,3-cyclohexane dimethanol, 1,4-cyclohexane dimethanol, 2,2,4,4-tetramethyl-1,3-cyclobutanediol, 4,4'-thiodiphenol, bisphenol A, 4,4'-methylene diphenol, 4,4'-(2-norbornylidene)diphenol, 4,4'-dihydroxy biphenyl, o-, m-, and p-dihydroxy benzene, 4,4'-isopropylidene phenol, cyclopentane-1,2-diol, cyclohexane-1,2-diol, and cyclohexane-1,4-diol.

The polyester resins falling under polyesters (A) preferably contain a naphthalene backbone and/or fluorene backbone. The addition of a fluorene backbone and/or naphthalene backbone to a polyester resin can make the backbone of the polyester resin rigid, thus raising the glass transition temperature (Tg) of the polyester resin. This is preferable also because the refractive index of the polyester resin can be increased, serving to allowing the aforementioned reflectance Rmin at the surface of the lamination layer (layer C) to stay in the preferred range. Method I) described above can produce a polyester resin with a naphthalene backbone and/or fluorene backbone as described above by using either a dicarboxylic acid component with a naphthalene backbone and/or fluorene backbone or a glycol component with a naphthalene backbone and/or fluorene backbone. Method II) described above can produce a polyester resin with a naphthalene backbone and/or fluorene backbone as described above by using a component having a naphthalene backbone and/or fluorene backbone and also having one or more alcoholic functional groups (hydroxyl groups) and one or more carboxyl groups.

For instance, such dicarboxylic acid components with a naphthalene backbone or fluorene backbone include, but not limited to, 9,9-bis(t-butoxy carbonyl methyl)fluorene, 9,9-bis[2-(t-butoxy carbonyl)ethyl] fluorene, 9,9-bis[1-(t-butoxy carbonyl)ethyl] fluorene, 9,9-bis[2-(t-butoxy carbonyl)-1-cyclohexyl ethyl] fluorene, 9,9-bis[2-(t-butoxy carbonyl)-1-phenyl ethyl] fluorene, 9,9-bis[1-(t-butoxy carbonyl)propyl] fluorene, 9,9-bis[2-(t-butoxy carbonyl) propyl] fluorene, 9,9-bis[2-(t-butoxy carbonyl)-1-methyl ethyl] fluorene, 9,9-bis[2-(t-butoxy carbonyl)-1-methyl propyl] fluorene, 9,9-bis[2-(t-butoxy carbonyl)butyl] fluorene, 9,9-bis[2-(t-butoxy carbonyl)-1-methylbutyl] fluorene, 9,9-bis[5-(t-butoxy carbonyl)pentyl] fluorene, 1,4-naphthalene dicarboxylic acid, and 2,6-naphthalene dicarboxylic acid. Glycol components with a naphthalene backbone and/or fluorene backbone include, but not limited to, 9,9-bis[4-(2-hydroxyethoxy)phenyl] fluorene, 9,9-bis[4-(2-hydroxyethoxy)-3-methyl phenyl] fluorene, 9,9-bis[4-(2-hydroxyethoxy)-3,5-dimethyl phenyl] fluorene, 9,9-bis[4-(2-hydroxyethoxy)-3-ethyl phenyl] fluorene, 9,9-bis[4-(2-hydroxyethoxy)-3,5-diethyl phenyl] fluorene, 9,9-bis[4-(2-hydroxy-yethoxy)-3-propyl phenyl] fluorene, 9,9-bis[4-(2-hydroxyethoxy)-3,5-dipropyl phenyl] fluorene, 9,9-bis[4-(2-hydroxyethoxy)-3-isopropyl phenyl] fluorene, 9,9-bis[4-(2-hydroxyethoxy)-3,5-diisopropyl phenyl] fluorene, 9,9-bis[4-(2-hydroxyethoxy)-3-n-butyl phenyl] fluorene, 9,9-bis[4-(2-hydroxyethoxy)-3,5-di-n-butyl phenyl] fluorene, 9,9-bis[4-(2-hydroxyethoxy) 10-3-isobutyl phenyl] fluorene, 9,9-bis[4-(2-hydroxyethoxy)-3,5-diisobutyl phenyl] fluorene, 9,9-bis[4-(2-hydroxyethoxy)-3-(1-methyl propyl)phenyl] fluorene, 9,9-bis[4-(2-hydroxyethoxy)-3,5-bis(1-methyl propyl)phenyl] fluorene, 9,9-bis[4-(2-hydroxyethoxy)-3-phenyl phenyl] fluorene, 9,9-bis[4-(2-hydroxyethoxy)-3,5-diphenyl phenyl] fluorene, 9,9-bis[4-(2-hydroxyethoxy)-3-benzyl phenyl] fluorene, 9,9-bis[4-(2-hydroxyethoxy)-3,5-dibenzyl phenyl] fluorene, 9,9-bis[4-(3-hydroxypropoxy)phenyl] fluorene, 9,9-bis[4-(4-hydroxybutoxy)phenyl] fluorene, 1,4-dihydroxy naphthalene, and 2,6-dihydroxy naphthalene.

The polyester resin in the lamination layer (layer C) necessarily contains a monomer having a sulfonic acid component as described above and preferably also contains a monomer having a multivalent, i.e., tri- or higher-valent carboxylic acid component. As regards the carboxylic acid component, a multivalent, i.e., tri- or higher-valent, carboxylic acid component may be copolymerized to introduce a carboxyl group into a side chain of a polyester resin. Such monomers having a sulfonic acid component include, for instance, alkali metal salts and alkaline earth metal salts of sulfoisophthalic acid, 5-sulfoisophthalic acid, 4-sulfophthalic acid, 4-sulfonaphthalene-2,7-dicarboxylic acid, and 5-[4-sulfophenoxy]

isophthalic acid. Usable monomers having a multivalent, i.e., tri- or higher-valent, carboxylic acid component also include multivalent carboxylic acids, such as trimellitic acid, and anhydrides. Specifically, they include 1,2,4,5-butane tetracarboxylic dianhydride (pyromellitic anhydride), 1,2,3,4-pentane tetracarboxylic dianhydride, 3,3',4,4'-benzophenone tetracarboxylic dianhydride, 5-(2,5-dioxotetrahydrofurfuryl)-3-methyl-3-cyclohexene-1,2-dicarboxylic anhydride, 5-(2,5-dioxotetrahydrofurfuryl)-3-cyclohexene-1,2-dicarboxylic anhydride, cyclopentane tetracarboxylic dianhydride, 2,3,6,7-naphthalene tetracarboxylic dianhydride, 1,2,5,6-naphthalene tetracarboxylic dianhydride, ethylene glycol bistrimellitate dianhydride, 2,2',3,3'-diphenyl tetracarboxylic dianhydride, thiophene-2,3,4,5-tetracarboxylic dianhydride, and ethylene tetracarboxylic dianhydride. Furthermore, the sulfonic acid groups and carboxylic acid groups may be neutralized with ammonia, sodium hydroxide, or the like into sulfonate groups, carboxylate groups, or the like. Introducing basic groups at terminals serves to improve hydrophilicity and water-solubility. A preferable method of carrying out copolymerization with a multivalent carboxylic acid component is to react a dicarboxylic acid component and a glycol component to produce a polyester polyol (polyester oligomer) and reacting it with a multivalent, i.e., tri- or higher-valent, carboxylic anhydride, thereby introducing a carboxyl group into a side chain of the polyester resin. This method is preferable because it can serve more efficiently to introduce a carboxyl group into a side chain of a polyester resin. Monomers having a sulfonic acid component and monomers having a multivalent, i.e., tri- or higher-valent carboxylic acid component as described above can be applied commonly to polyesters (A) and polyesters (B). Analysis of these monomer components constituting a polyester resin can be performed by extracting components of the coating layer (layer C) with an organic solvent and examining the extract using $^1$H-NMR, $^{13}$C-NMR, IR, heat decompose GC/MS, or combinations thereof.

The lamination layer (layer C) can contain polyester resins (hereinafter referred to as polyesters (C)) that belong to neither polyesters (A) nor polyesters (B) (not in any of the ranges of glass transition temperature (Tg)) unless they impair desired features. Their contents are preferably 30 parts by weight or less, more preferably 20 parts by weight or less, of the total weight, accounting for 100 parts by weight, of the polyester resins. If the content of polyesters (C) is more than 30 parts by weight, their durability as well as adhesion to the hard coat layer will deteriorate in some cases.

The lamination layer (layer C) preferably contains, as a crosslinking agent, a melamine based crosslinking agent and/or oxazoline based crosslinking agent to improve the adhesion to the hard coat layer, particularly to improve the retention of adhesive in a wet-heat resistant environment. The content of the melamine based crosslinking agent and/or oxazoline based crosslinking agent is preferably 20 to 80 parts by weight, more preferably 30 to 60 parts by weight, relative to 100 parts by weight of the polyester resin. The adhesive strength may be poor if the content is less than 20 parts by weight, while the number of coating defects tends to increase if it is more than 80 parts by weight. There are no specific limitations on the melamine based crosslinking agent to be used and usable ones include melamine, methylolated melamine derivatives produced by condensing melamine and formaldehyde, partially or completely etherified compounds produced by reacting methylolated melamine with lower alcohol, and mixture thereof. The melamine based crosslinking agent used may be a condensation product of monomers, dimmers, or higher-mers, or a mixture of such products. Usable lower alcohols for etherification include methyl alcohol, ethyl alcohol, isopropyl alcohol, n-butanol, and isobutanol. Usable functional groups are those containing an alkoxy methyl group, such as imino group, methylol group, methoxy methyl group, and butoxy methyl group, in one molecule, and the corresponding resins include imino type methylated melamine resin, methylol type melamine resin, methylol type methylated melamine resin, and complete alkyl type methylated melamine resin. Of these, methylolated melamine resin is the most preferable. In addition, an acidic catalyst such as, for instance, p-toluene sulfonic acid may be used to promote the heat curing of a melamine based crosslinking agent. There are no specific limitations on the oxazoline based crosslinking agent to be used as long as the compound contains an oxazoline group as functional group, but preferable is one comprising an oxazoline based copolymer containing at least one monomer containing an oxazoline group and produced by copolymerizing it with at least one other monomer.

For the lamination layer (layer C), a crosslinking agent other than the melamine based crosslinking agents and/or oxazoline based crosslinking agents may be used unless it impairs desired features, and preferable ones include, for instance, epoxy based crosslinking agents and carbodiimide based crosslinking agents. There are no specific limitations on the type of epoxy based crosslinking agent to be used, and usable ones include, for instance, sorbitol polyglycidyl ether based, polyglycerol polyglycidyl ether based diglycerol polyglycidyl ether based, polyethylene glycol diglycidyl ether based, or polyethylene glycol diglycidyl ether based ones. There are no specific limitations on the carbodiimide based crosslinking agent as long as one or a plurality of carbodiimide groups or cyanamide groups that are tautomeric relation with the former are contained as functional groups in the molecule of the compound. Specific examples of such carbodiimide compounds include dicyclohexyl methane carbodiimide, dicyclohexyl carbodiimide, tetramethyl xylylene carbodiimide, and urea modified carbodiimide, which may be used singly or as a mixture of two or more thereof.

The lamination layer (layer C) preferably contains an acrylic resin to increase the versatile initial adhesion and wet-heat-resistant adhesion (durability of adhesion) to the hard coat layer. This is because the local densities of the acrylic resin component and the polyester resin component, i.e., the primary component, existing in the lamination layer (layer C) vary along the thickness direction of the lamination layer (layer C) and, accordingly, acrylic resin components that have a poor hydrophilicity but a higher adhesiveness to the hard coat layer exist in a larger amount at the surface that constitutes the interface with the hard coat layer. It is considered that the existence of this structural feature in the lamination film serves to reduce the reflected light from the interface with the hard coat layer and prevent the deterioration of interference fringes. This structural feature in the lamination film can be confirmed by dyeing the acrylic resin and observing its cross section by transmission electron microscopy (TEM).

For the acrylic resin, the monomer components usable to constitute the acrylic resin include, for instance, hydroxy-containing monomers such as alkyl acrylate, alkyl methacrylate (usable alkyl group include methyl group, ethyl group, n-propyl group, isopropyl group, n-butyl group, isobutyl group, t-butyl group, 2-ethylhexyl group, lauryl group, stearyl group, cyclohexyl group, phenyl group, benzyl group, and phenyl ethyl group), 2-hydroxyethyl acrylate, 2-hydroxyethyl methacrylate, 2-hydroxypropyl acrylate, and 2-hydroxypropyl methacrylate; amide-containing monomers such as acrylamide, methacrylamide, N-methyl acrylamide, N-methyl methacrylamide, N-methylol acrylamide, N-methylol methacrylamide, N,N-dimethylol acrylamide, N-methoxy methyl acrylamide, N-methoxy methyl methacrylamide, and N-phenyl acrylamide; amino-containing monomers such as N,N-diethylaminoethyl acrylate and N,N-diethylaminoethyl methacrylate; epoxy-containing monomers such as glycidyl acrylate and glycidyl methacrylate; and monomers containing a carboxyl group and a salt thereof such as acrylic acid, methacrylic acid, and salts thereof (lithium salt, sodium salt, potassium salt and the like), of which one or a plurality are subjected to (co)polymerization. There are no specific limitations on the glass transition point (Tg) of the acrylic resin, but it is preferably 0 to 90° C., more preferably 10 to 80° C. Acrylic resins with a low Tg tends to be poor in wet-heat resistant adhesiveness (durability of adhesion), while those with a high Tg may be poor in film-forming performance. The acrylic resin is preferably in the form of a water dispersion, i.e., emulsion, with a particle diameter of 100 nm or less, more preferably a water dispersion with a particle diameter of 60 nm or less. The wet-heat resistant adhesiveness (durability of adhesion) to the hard coat may be low if the acrylic resin completely dissolves in water, while an emulsion with a particle diameter of larger than 100 nm will lead to a film that is poor in appearance and unsuitable as hard coat film. The quantity of the acrylic resin to mixed is preferably 5 to 30 parts by weight, more preferably 10 to 30 parts by weight, relative to 100 parts by weight of the polyester resin. The adhesive strength and wet-heat resistant adhesiveness (durability of adhesion) may not be improved sufficiently if the acrylic resin content is less than 5 parts by weight, while more serious interference fringes tend to take place if it is more than 30 parts by weight.

For the lamination layer (layer C), it is preferable to add a surface active agent with the aim of improving the uniformity of film thickness and prevent the formation of coating defects, and its content is preferably 0.5 to 3.0 parts by weight, more preferably 1.0 to 1.5 parts by weight, relative to 100 parts by weight of the polyester resin. If it is less than 0.5 parts by weight, the surface active agent will not have adequate effect in some cases, whereas if it is more than 3.0 parts by weight, the adhesion to the hard coat layer tends to deteriorate. There are no specific limitations on the surface active agent to be used, and usable ones include nonionic surface active agents (for instance, polyoxyethylene alkyl phenyl ether, polyoxyethylene alkyl ether, sorbitan fatty acid ester and the like), ionic surface active agents (for instance, sulfate esters of higher alcohol and salts thereof, alkyl benzene sulfonate, polyoxyethylene alkyl phenyl sulfonate, alkyl(amide) betaine, alkyl dimethyl amine oxide and the like), fluorochemical surface active agents (for instance, fluoroalkyl carboxylate, perfluoroalkyl benzene sulfonate, quaternary ammonium salt of perfluoroalkyl, perfluoroalkyl polyoxyethylene ethanol and the like), which may be used singly or as a mixture of two or more thereof. In particular, the use of a fluorine surface active agent is preferable in terms of the uniformity of the lamination layer (layer C) and the effect of suppressing coating defects. To improve the leveling performance, furthermore, a water-soluble solvent may be used in combination, and usable ones include, for instance, alcohols such as methyl alcohol, ethyl alcohol, isopropyl alcohol, ethyl carbitol, ethyl cellosolve, and butyl cellosolve; and polarity solvents such as N-methylpyrrolidone; which may be used singly or as a mixture of two or more thereof.

The addition of fine particles to the lamination layer (layer C) is also preferable because the lubricity and blocking resistance will be improved. There are no specific limitations on the fine particles to be used, and usable particles include inorganic particles such as of colloidal silica, titanium oxide, aluminum oxide, zirconium oxide, calcium carbonate, carbon black, and zeolite and organic particles such as acrylic particles, silicone particles, polyimide particles, Teflon (registered trademark) particles, crosslinked polyester particles, crosslinked polystyrene particles, crosslinked polymer particles, and core shell particles, which may be used singly or as a combination of a plurality thereof. These particles preferably have a number average primary particle diameter in the range of 10 to 600 nm. The average primary particle diameter referred to herein is the average of particle diameters of primary particles each deemed as a particle grown from a single crystal nucleus as defined in JIS-H7008 (2002). The average primary particle diameter of these particles is more preferably 20 to 500 nm, still more preferably 20 to 400 nm. The particles to be used may be in the form of monodisperse particles or agglomerated particles composed of a plurality of particles that are agglomerated. In some cases, a plurality of different types of particles differing in average primary particle diameter may be used in combination. The quantity of particles to be added should be controlled and designed appropriately depending on the thickness and resin composition of lamination layer (layer C), average primary particle diameter, required lubricity, and intended uses, but it is preferably 0.05 to 8 parts by weight, more preferably 0.1 to 5 parts by weight, relative to the total weight, accounting for 100 parts by weight, of the lamination layer (layer C). The lubricity and blocking resistance will not be sufficiently high in some cases if the average primary particle diameter is less than 10 nm or if the particles added account for less than 0.05 parts by weight, whereas particles tend to come off and the appearance tends to deteriorate if the average primary particle diameter is more than 600 nm or if the particles added account for more than 8 parts by weight.

Furthermore, lamination layer (layer C) the laminated polyester film may also contain various additives including, for instance, antioxidant, thermal stabilizer, weathering stabilizer, ultraviolet absorber, organic lubricant, pigments, dye, organic or inorganic fine particles, filler, antistatic agent, and nucleating agent, unless they impair the desired effect.

Furthermore, there are no specific limitations on the coating method to be used to coat a layer, and usable methods include, for instance, reverse coating, spray coating, bar coating, gravure coating, rod coating, and die coating, but thickness irregularities in the lamination layer (layer C) may lead to interference fringes after carrying out hard coating. Therefore, it is preferable to use the gravure coating technique or the bar coating technique, which can serve for uniform coating without thickness irregularities, and it is particularly preferable to perform bar coating using a measuring bar.

The term polyester that is used in association with the constitution of the polyester base film (layer S) generically refers to polymers in which the major bonds in the backbone chain are ester bonds, and preferable usable polyesters include those containing, as major constituent, at least one constituent selected from the group consisting of ethylene terephthalate, ethylene-2,6-naphthalate, butylene terephthalate, and ethylene-$\alpha,\beta$-bis(2-chlorophenoxy) ethane-4,4'-dicarboxylate. These constituents may be used singly or as a combination of two or more thereof, but in view of overall evaluation for quality, economic efficiency, and the like, it is particularly preferable to use a polyester containing ethylene terephthalate as the major constituent. For applications where heat is applied to the base material, it may be appropriate to use polyethylene-2,6-naphthalate which is high in heat resistance and rigidity. Furthermore, these polyesters may be copolymerized partially with still other dicarboxylic acid components or diol components preferably in an amount of 20 mol % or less.

The intrinsic viscosity (measured in o-chlorophenol at 25° C. according to JIS K7367 (2000)) of the aforementioned polyesters is preferably in the range of 0.4 to 1.2 dl/g, more preferably 0.5 to 0.8 dl/g.

In addition, these polyesters may also contain various additives including, for instance, antioxidant, thermal stabilizer, weathering stabilizer, ultraviolet absorber, organic lubricant, pigments, dye, organic or inorganic fine particles, filler, antistatic agent, nucleating agent, and crosslinking agent unless they deteriorate the characteristics of the polyesters. To impart ultraviolet shielding ability to a polyester film, in particular, it is preferable to add an ultraviolet absorber. Preferable examples of the ultraviolet absorber include, for instance, salicylic acid based compounds, benzophenone based compounds, benzotriazole based compounds, cyanoacrylate based compounds, benzoxazinone based compounds, and cyclic imino ester based compounds, of which benzoxazinone based compounds are the most preferable from the viewpoint of the ultraviolet shielding ability at 380 nm, color tone, and development of the effect of improving dispersibility by controlling the undermentioned values of M+P and M/P (M represents the concentration in mmol % of the catalyst metal residues remaining in the film, while P represents the concentration in mmol % of phosphorus remaining in the film) of polyesters. These compounds may be used singly or as a combination of two or more thereof. In addition, a stabilizer such as HALS and antioxidant may also be used in combination, and in particular, it is preferable to use a phosphorus based antioxidant in combination.

Benzotriazole based compounds usable here include, for instance, 2-(2H-benzotriazole-2-yl)-4,6-bis(1-methyl-1-phenylethyl)phenol, 2-(2H-benzotriazole-2-yl)-4-(1,1,3,3-tetramethylbutyl)phenol, 2-(2H-benzotriazole-2-yl)-4-methyl phenol, 2-(2H-benzotriazole-2-yl)-4,6-di-t-butyl phenol, 2-(2H-benzotriazole-2-yl)-4,6-di-t-amyl phenol, 2-(2H-benzotriazole-2-yl)-4-t-butyl phenol, 2-(2'-hydroxy-3'-t-butyl-5'-methyl phenyl)-5-chlorobenzotriazole, 2-(2'-hydroxy-3', 5'-di-t-butyl phenyl)-5-chlorobenzotriazole.

Usable benzophenone based compounds include, for instance 2-hydroxy-4-octoxy benzophenone, 2-hydroxy-4-methoxy benzophenone, 2,2'-dihydroxy-4,4'-dimethoxy benzophenone, 2,2',4,4'-tetrahydroxy benzophenone, 2,4-dihydroxy benzophenone, and 2-hydroxy-4-methoxy benzophenone-5-sulfonic acid.

Usable benzoxazinone based compounds include, for instance 2-p-nitrophenyl-3,1-benzoxazine-4-one, 2-(p-benzoyl phenyl)-3,1-benzoxazine-4-one, 2-(2-naphthyl)-3,1-benzoxazine-4-one, 2,2'-p-phenylene bis(3,1-benzoxazine-4-one), and 2,2'-(2,6-naphthylene) bis(3,1-benzoxazine-4-one).

The laminated polyester film preferably has a transmittance of 5.0% or less at a wavelength of 380 nm, and the transmittance at 380 nm is more preferably 3.0% or less. This transmittance range at a wavelength 380 nm is specified here from the viewpoint of the ultraviolet protection function of other materials and compounds that are expected to be applied to display members requiring protection of base material, and films that have an appropriately controlled total light transmittance, haze, and b-value as well as a transmittance controlled in the above range will serve favorably for surface protection and surface decoration of various display members including LCD, electronic paper, EL display, plasma display, and touch panel, as well as mobile instruments in particular. The addition of fine particles, however, often works to decrease transparency-related characteristics such as light transmittance and haze, and if fine particles are to be added, they should be as small in particle diameter as possible and preferably has a particle diameter equal to about ¼ or less of the visible light wavelength range where scattering is not likely to occur. Preferably, their quantity is also small.

The polyester base film (layer S) is preferably a biaxially orientated polyester film. A biaxially orientated film as referred to herein is defined as one that shows a biaxially orientated pattern in wide angle X-ray diffraction observation. In general, a biaxially orientated polyester film can be produced by stretching an unstretched polyester sheet 2.5 to 5.0 times in the sheet length direction and in the width direction and subsequently heat-treating it to ensure completion of crystal orientation.

With respect to the polyester base film (layer S), layer S itself may have a layered structure containing two or more layers. The layered structure may be a composite film structure composed of, for instance, an inner layer and a surface layer, with the inner layer substantially being free of particles and the surface layer containing particles. The polymer of the inner layer and that of the surface layer may be of chemically different species or of the same species. For display applications, layer S is preferably free of particles from the viewpoint of optical characteristics such as transparency. There are no specific limitations on the thickness of layer S, which serves as base, and an appropriate material may be selected for particular uses, but it is commonly 10 to 500 μm, preferably 20 to 300 μm, and more preferably 38 to 250 μm.

Described next is a production method of the laminated polyester film using, as an example, polyethylene terephthalate (hereinafter, occasionally abbreviated as PET) film as the polyester base film (layer S), but the method should not be construed as limited thereto.

Pellets of PET with a intrinsic viscosity of 0.5 to 0.8 dl/g to be used as material for the polyester base film (layer S) is vacuum-dried, subsequently supplied to an extruder, melted at 260 to 300° C., extruded from a T-die into a sheet, brought into contact with a mirror finished casting drum with a surface temperature of 10 to 60° C. by the electrostatic casting technique, and cooled to solidify into an unstretched PET film. This unstretched film is stretched 2.5 to 5.0 times in the longitudinal direction (i.e., travelling direction of the film, also referred to as the length direction) between rollers heated at 70 to 100° C. This film is subjected to corona discharge treatment, if necessary, to adjust the wetting tension of the surface to 47 mN/m or more, and this treated surface is coated with an aqueous coating material used to form the lamination layer (layer C). This coated laminated polyester film is held by clips, introduced into a drying zone to dry the coating layer, subsequently heated at a temperature of 70 to 150° C., then stretched continuously 2.5 to 5.0 times in the transverse direction (i.e., the direction perpendicular to the travelling direction of the film and also referred to as the width direction) in a heating zone at 70 to 150° C., heat-treated for 5 to 40 seconds in a heating zone at 200 to 240° C., passed through a cooling zone at 100 to 200° C. to provide a polyester film composed of a polyester base film (layer S) laminated with a lamination layer (layer C) in which crystal orientation has been completed. During the above heat treatment, relaxation treatment by 3 to 12% may be performed as required. The above biaxial stretching may be carried out by sequential longitudinal and transverse stretching or by simultaneous biaxial stretching, and may be re-stretched either in the longitudinal or transverse direction after longitudinal and transverse stretching. After cutting out edge portions, the biaxially orientated laminated polyester film obtained was wound up to provide an intermediate, which is then cut by a slitter to an intended width and wound up on a tubular core to provide a roll of polyester film with an intended length. In the winding up step, both edges of the film may be embossed to improve the appearance.

Described below is a hard coat film produced by forming a hard coat layer on the laminated polyester film.

There are no specific limitations on the material to constitute the hard coat layer as long as it permeates visible light, but it is preferable to use a material with a high transmittance. Usable materials include acrylic based resin, polycarbonate based resin, vinyl chloride based resin, polyester based resin, urethane based resin, and actinic ray curable resin. In particular, acrylic based resin, urethane based resin, and actinic ray curable resin can be used favorably from the viewpoint of abrasion resistant and productivity.

With respect to the actinic ray curable resin used to constitute a hard coat layer, usable monomer components to constitute the actinic ray curable resin include polyfunctional (meth)acrylic compounds such as, for instance, pentaerythritol tri(meth)acrylate, pentaerythritol tetra(meth)acrylate, dipentaerythritol tri(meth)acrylate, dipentaerythritol tetra (meth)acrylate, dipentaerythritol penta(meth)acrylate, dipentaerythritol hexa(meth)acrylate, trimethylolpropane tri (meth)acrylate, bis(methacryloyl thiophenyl)sulfide, 2,4-dibromophenyl (meth)acrylate, 2,3,5-tribromophenyl (meth) acrylate, 2,2-bis(4-(meth)acryloyloxy phenyl)propane, 2,2-bis(4-(meth)acryloyloxy ethoxy phenyl) propane, 2,2-bis(4-(meth)acryloyloxy diethoxy phenyl) propane, 2,2-bis(4-(meth)acryloyl pentaethoxy phenyl) propane, 2,2-bis(4-(meth)acryloyloxy ethoxy-3,5-dibromophenyl) propane, 2,2-bis(4-(meth)acryloyloxy diethoxy-3,5-dibromophenyl) propane, 2,2-bis(4-(meth)acryloyloxy pentaethoxy-3,5-dibromophenyl) propane, 2,2-bis(4-(meth)acryloyloxy ethoxy-3,5-dimethyl phenyl) propane, 2,2-bis(4-(meth)acryloyloxy ethoxy-3-phenyl phenyl) propane, bis(4-(meth)acryloyloxy phenyl) sulfone, bis(4-(meth)acryloyloxy ethoxy phenyl) sulfone, bis(4-(meth)acryloyloxy pentaethoxy phenyl) sulfone, bis(4-(meth)acryloyloxy ethoxy-3-phenyl phenyl) sulfone, bis(4-(meth)acryloyloxy ethoxy-3,5-dimethyl phenyl) sulfone, bis(4-(meth)acryloyloxy phenyl) sulfide, bis(4-(meth)acryloyloxy ethoxy phenyl) sulfide, bis(4-(meth)acryloyloxy pentaethoxy phenyl) sulfide, bis(4-(meth)acryloyloxy ethoxy-3-phenyl phenyl) sulfide, bis(4-(meth) acryloyloxy ethoxy-3,5-dimethyl phenyl) sulfide, di((meth) acryloyloxy ethoxy) phosphate, and tri((meth)acryloyloxy ethoxy) phosphate, which may be used singly or as a combination of two or more thereof.

These polyfunctional (meth)acrylic compounds may be combined with styrene, chlorostyrene, dichlorostyrene, bromostyrene, dibromostyrene, divinylbenzene, vinyl toluene, 1-vinyl naphthalene, 2-vinyl naphthalene, N-vinyl pyrolidone, phenyl (meth)acrylate, benzyl (meth)acrylate, biphenyl (meth)acrylate, diallyl phthalate, dimethallyl phthalate, diallyl biphenylate, or reaction products of (meth)acrylic acid with metal such as barium, lead, antimony, titanium, tin, and zinc, to control the hardness, transparency, strength, and refractive index of the actinic ray curable resin. These may be used singly or as a mixture of two or more thereof.

It should be noted that the term "(meth)acrylic compounds" refers to "methacrylic (also referred to as methacryl) compounds and acrylic compounds," and similar express may be used for other compounds.

Usable methods for curing an actinic ray curable resin include, for instance, irradiation with ultraviolet ray, and when using the method, it is desirable to add a photopolymerization initiator in an amount of about 0.01 to 10 parts by weight relative to the weight of the compound.

The actinic ray curable resin used may contain an organic solvent such as isopropyl alcohol, ethyl acetate, and methyl ethyl ketone with the aim of improving the coating workability and controlling the coating thickness, unless they impair the desired effect.

The term "actinic ray" refers to electromagnetic rays such as ultraviolet rays, electron beam, and radiations ($\alpha$ ray, $\beta$ ray, $\gamma$ ray and the like) that can polymerize acrylic vinyl groups, and practically, the use of ultraviolet rays is easy and preferable. Usable sources of ultraviolet rays include ultraviolet fluorescent lamp, low pressure mercury lamp, high pressure mercury lamp, ultrahigh pressure mercury lamp, xenon lamp, and carbon arc lamp. The use of electron beam is advantageous because it is not necessary to add an photopolymerization initiator or light sensitization agent although it requires expensive equipment and operation in an inactive gas environment.

Not only the hard coat layer itself but also the laminated polyester film and other members preferably contain an ultraviolet absorber for protection against ultraviolet rays. There are no specific limitations on the ultraviolet absorber to be used, and generally known conventional ultraviolet absorber such as, for instance, salicylic acid based compounds, cyanoacrylate based compounds, benzophenone based compounds, and benzotriazole based compounds may be used. Of these, the use of a benzophenone based compound and/or benzotriazole based compound is preferable from the viewpoint of, for instance, weather resistance for outdoor uses. Usable benzophenone based compounds include 2-hydroxy-4-methoxy benzophenone, 2,4-dihydroxy benzophenone, 2-hydroxy-4-n-octoxy benzophenone, 2-hydroxy-4-methoxy-2'-carboxy benzophenone, 2,2'-dihydroxy-4,4'-dimethoxy benzophenone, 2-hydroxy-4-benzoyloxy benzophenone, 2,2'-dihydroxy-4-methoxy benzophenone, 2-hydroxy-4-methoxy-5-sulfone benzophenone, 2,2',4,4'-tetrahydroxy benzophenone, 2,2'-dihydroxy-4,4'-dimethoxy benzophenone, 2-hydroxy-5-chlorobenzophenone, bis-(2-methoxy-4-hydroxy-5-benzoyl phenyl) methane. Usable benzotriazole based compounds include 2-(2'-hydroxyphenyl) benzotriazole, 2-(2'-hydroxy-5'-methyl phenyl) benzotriazole, 2-(2'-hydroxy-5-methyl phenyl)-5-carboxylic acid butyl ester benzotriazole, 2-(2'-hydroxy-5'-methyl phenyl)-5, 6-dichlorobenzotriazole, 2-(2'-hydroxy-5'-methyl phenyl)-5-ethyl sulfone benzotriazole, 2-(2'-hydroxy-5'-t-butyl phenyl)-5-chlorobenzotriazole, 2-(2'-hydroxy-5'-t-butyl phenyl) benzotriazole, 2-(2'-hydroxy-5'-amino-phenyl) benzotriazole, 2-(2'-hydroxy-3',5'-dimethyl phenyl) benzotriazole, 2-(2'-hydroxy-3',5'-dimethyl phenyl)-5-methoxy benzotriazole, 2-(2'-methyl-4'-hydroxyphenyl) benzotriazole, 2-(2'-stearyl oxy-3',5'-dimethyl phenyl)-5-methyl benzotriazole, 2-(2'-hydroxy-5-carboxylic acid phenyl) benzotriazole ethyl ester, 2-(2'-hydroxy-3'-methyl-5'-t-butyl phenyl) benzotriazole, 2-(2'-hydroxy-3',5'-di-t-butyl phenyl)-5-chlorobenzotriazole, 2-(2'-hydroxy-3'-t-butyl-5'-methyl phenyl)-5-chlorobenzotriazole, 2-(2'-hydroxy-5'-methoxyphenyl) benzotriazole, 2-(2'-hydroxy-3',5'-di-t-butyl phenyl)-5-chlorobenzotriazole, 2-(2'-hydroxy-5'-cyclohexyl phenyl) benzotriazole, 2-(2'-hydroxy-4',5'-dimethyl phenyl)-5-carboxylic acid benzotriazole butyl ester, 2-(2'-hydroxy-3',5'-dichlorophenyl) benzotriazole, 2-(2'-hydroxy-4',5'-dichlorophenyl) benzotriazole, 2-(2'-hydroxy-3',5'-dimethyl phenyl)-5-ethyl sulfone benzotriazole, 2-(2'-hydroxy-4'-octoxyphenyl) benzotriazole, 2-(2'-hydroxy-5'-methoxyphenyl)-5-methyl benzotriazole, 2-(2'-hydroxy-5'-methyl phenyl)-5-carboxylate benzotriazole, and 2-(2'-acetoxy-5'-methyl phenyl) benzotriazole.

The ultraviolet absorbers in the hard coat layer preferably account for 0.5 parts by weight to 30 parts by weight, more preferably 3 to 20 parts by weight, of the hard coat layer. If the content of the ultraviolet absorber is more than 30 parts by weight, it tends to lead to a decrease in the surface hardness of the hard coat layer or a decrease in the adhesive strength of the hard coat layer. If it is less than 0.5 parts by weight, the film may fail to have a sufficiently high ultraviolet ray absorption function. In general, the hard coat layer is required to have an ultraviolet ray absorption function equivalent to a transmittance of about 40 to 70% at a wavelength of 380 nm from the viewpoint of the need for maintaining a surface hardness and adhesive strength as described above. The required ultraviolet ray absorption ability varies depending on the intended uses of the hard coat film, but in the case where the film does not have a sufficiently high ultraviolet ray absorption ability, the addition of an ultraviolet absorber to the polyester base film layer can sometimes work to reduce the transmittance at 380 nm to less than 1%.

With respect to the refractive index of the hard coat layer, the light reflection that can cause interference fringes can be suppressed by adjusting it to minimize the difference in refractive index at the interface with the surface of the lamination layer (layer C). Thus, the hard coat layer preferably has a refractive index of 1.45 to 1.55, more preferably 1.48 to 1.53. There are no specific limitations on the thickness of the hard coat layer, and it should be adjusted and designed appropriately to meet particular use requirements, but commonly it is 1 to 10 µm, preferably 2 to 5 µm. If the hard coat layer has a thickness in this preferable range, it will allow the hard coat to show sufficiently high performance while preventing the film from curling due to shrinkage during the curing of the hard coat layer.

The surface of the hard coat layer is preferably provided with an antireflection layer for flicker prevention and antifouling treatment for contamination prevention. Alternatively, the hard coat layer may be laminated with a high refractive index hard coat layer and a low refractive index layer, which acts as antireflection layer, on top of it to serve as an antireflection film. There are no specific limitations on the antireflection layer, and it can be formed through a lamination step carried out by coating with a low refractive index compound or sputtering or deposition of an inorganic compound such as magnesium fluoride and silicon oxide. Antifouling treatment can be effected by carrying out an antifouling treatment step using, for instance, silicone based resin and fluorine based resin.

EXAMPLES

Methods for Measurement of Properties

The constitution and effect are described in more detail below with reference to Examples. It should be noted that our films and methods should not be construed as limited to the Examples provided below. Prior to giving Examples, methods used for measuring various properties are described first.

(1) Glass Transition Temperature (Tg) of Polyester Resin

Measurements were made by using equipment consisting mainly of a robot DSC (differential scanning calorimeter), RDC220 supplied by Seico Electronics industrial Co., Ltd., equipped with a disk station, SSC5200 supplied by Seico Electronics industrial Co., Ltd. A 10 mg quantity of a specimen (solid resin material) was prepared on an aluminum pan, heated for 5 minutes at a temperature of 300° C., and then quenched with liquid nitrogen. Following this, measurements were made while heating it at a rate of 20° C./min to obtain a DSC curve. From the resulting DSC curve, the glass transition temperature (Tg) was calculated by the procedure described below. Two extended lines were drawn from the DSC curve in the vicinity of the glass transition temperature (Tg) and the glass transition temperature (Tg) was calculated from the intersection of the center line between the extended lines and the DSC curve. (See FIG. 1.)

(2) Spectral Reflectance

A black glossy tape with a width of 50 mm (Vinyl Tape No. 200-50-21, black, supplied by Yamato Co., Ltd.) was pasted to the surface opposite to the measuring surface of a sample in such a manner that their length directions coincided and that bubbles would not be caught, and then an about 40 mm×40 mm specimen was cut out and subjected to mirror specular reflectance measurement at an incidence angle of 5° using a spectrophotometer (UV2450 mirror specular reflectance measuring unit, supplied by Shimadzu Corporation). The specimen was mounted on the measuring equipment in such a manner that the length direction of the specimen coincided with the front-to-rear direction of the equipment when looked from in front of it. An accessory $Al_2O_3$ plate was used as reference reflector to normalize the measured reflectance. The reflectance was measured in the wavelength range of 400 to 700 nm to determine the wavelength, λmin(nm), at which the reflectance reached a minimum and the reflectance, Rmin(%), at wavelength λmin(nm).

(3) Evaluation of Initial Adhesive Strength (A) Preparation of Hard Coat Film (a) Hard Coat Free of Ultraviolet Absorber An actinic ray curable resin (Shiko UV-1700B, [refractive index: 1.50 to 1.51], supplied by Nippon Synthetic Chemical Industry Co., Ltd. industry) adopted to form a hard coat layer was spread uniformly over the surface of the lamination layer (layer C) of a laminated polyester film using a bar coater in such a manner that the cured film would have a thickness of 1.5 µm. Subsequently, using a concentrating type high pressure mercury lamp (H03-L31, Eye Graphics Co., Ltd.) with an irradiation intensity of 120 W/cm set at a height of 9 cm above the surface of the hard coat layer, it was exposed to a total ultraviolet irradiation of 300 $mJ/cm^2$ and cured to provide a hard coat film composed of a laminated polyester film laminated with a hard coat layer. An industry type UV checker (UVR-N1, supplied by Japan Storage Battery Co., Ltd.) was used to measure the total ultraviolet irradiation.

(b) Hard Coat Containing Ultraviolet Absorber

A hard coat layer composed of the following constituents is spread uniformly over the lamination layer (layer C) of a laminated polyester film using a bar coater so that the cured film would have a thickness of 1.5 µm:

actinic ray curable resin (Opstar Z7534, supplied by JSR Corporation)
100 parts by weight
ultraviolet absorber (Placcel UVA103, supplied by Daicel Chemical Industries, Ltd.)
10 parts by weight
photoinitiator (Irgacure 1700, supplied by BASF)
5 parts by weight Subsequently, drying was conducted at 100° C., and then by a concentrating type high pressure mercury lamp (H03-L31, Eye Graphics Co., Ltd.) with an irradiation intensity of 120 W/cm set at a height of 9 cm above the surface of layer C, it was exposed to a total ultraviolet irradiation of 600 $mJ/cm^2$ and cured to provide a hard coat film composed of a laminated polyester film laminated with a hard coat layer. An industry type UV checker (UVR-N1, supplied by Japan Storage Battery Co., Ltd.) was used to measure the total ultraviolet irradiation.

(B) Initial Adhesiveness

A lattice pattern containing 100 squares of 1 mm$^2$ was cut in the aforementioned hard coat layer of the hard coat film. Except for the following, the same operations as specified in clause 7 of JIS K5600-5-6 (1999) were carried out:

test conditions and number of test runs: Despite the provisions specified in item 7.1.1 of JIS K5600-5-6 (1999), the test conditions included 23° C. and a relative humidity of 65%. One test run was carried out.

curing of test plate: Despite the provisions specified in item 7.1.2 of JIS K5600-5-6 (1999), the curing conditions included a temperature of 23° C., a relative humidity of 65%, and a curing period of 1 hour.

number of cuts: Despite the provisions specified in item 7.1.3 of JIS K5600-5-6 (1999), the number of cuts was 11.

intervals of cuts: Despite the provisions specified in item 7.1.4 of JIS K5600-5-6 (1999), the intervals of cuts was 1 mm.

cutting and removal of coated film by manual operations: The provisions specified in item 7.2.5 of JISK5600-5-6 (1999) are not applied. Specifically, brushing with a brush is not performed. Of the provisions of item 7.2.6 of JIS K5600-5-6 (1999), only the provision in the second paragraph (The tape is put on a grid so that its center is in parallel with a pair of the rectangular cuts as shown in FIG. 3, and the tape is pressed flat with a finger over the portion overlapping with the grid and an additional length of 20 mm or more), and the other provisions are not applied. The tape used here should be a cello-phane tape (Cellotape (registered trademark) CT405AP, supplied by Nichiban Co., Ltd.).

The pasting of the tape was conducted by pressing it with a hand roller (HP515, supplied by Audio-Technica Corporation) under a load of 19.6 N/m and moving it forward and backward alternately three times at a roller travelling speed of 5 cm/second. Then, the tape was peeled off at a speed of 10 cm/second in a direction 90 degrees from the direction of the surface of the hard coat layer, and the specimen was evaluated according to four-rank criteria based on the number of squares remaining on the hard coat layer. When the number of remaining squares was 100/100 (number of remaining squares/number of observed squares), measurement was conducted again with half the total ultraviolet irradiation specified in paragraph (A), and the specimen was ranked as 5 if the result was 100/100 (number of remaining squares/number of observed squares). Rank 5 or more indicates very high initial adhesiveness, rank 4 or more indicating good, rank 3 indicating practically good, and rank 2 or less indicating poor initial adhesiveness.

5: 100/100 (number of remaining squares/number of observed squares): under half the specified ultraviolet irradiation
4: 100/100: under specified ultraviolet irradiation
3: 80/100 or more, less than 100/100
2: 50/100 or more, less than 80/100
1: less than 50/100.

(4) Wet-Heat Resistant Adhesiveness
(A) Evaluation Based on High-Temperature, High-Humidity Test (Wet-Heat-Resistant Adhesion Index)

Procedures similar to that in paragraph (3) were carried out to provide a hard coat laminated film containing no ultraviolet absorber and a hard coat laminated film containing an ultraviolet absorber. The resulting films were left to stand for 250 hours in a constant temperature and humidity tank at a temperature of 60° C. and relative humidity of 90% to provide a specimens for wet-heat-resistant adhesion test. Each of the resulting specimens for wet-heat-resistant adhesion test was subjected to adhesion test by a procedure as described in paragraph (3)(B), and evaluated according to five-rank criteria based on the number of remaining squares to determine its wet-heat-resistant adhesion index. Rank 5 or more indicates very high wet-heat resistant adhesiveness, rank 4 or more indicating good, rank 3 indicating practically good, and rank 2 or less indicating poor wet-heat resistant adhesiveness.

5: 100/100 (number of remaining squares/number of observed squares)
4: 90/100 or more, less than 100/100
3: 80/100 or more, less than 90/100
2: 50/100 or more, less than 80/100
1: less than 50/100.

(B) Evaluation Based on Boiling Test (Boiling Resistant Adhesion Index)

Procedures similar to that in paragraph (3) were carried out to provide a hard coat laminated film containing no ultraviolet absorber and a hard coat laminated film containing an ultraviolet absorber. The resulting films were left to stand for 1 hour in boiling pure water (100° C.) to provide specimens for boiling resistant adhesion test. Each of the resulting specimens for boiling resistant adhesion test was subjected to adhesion test by a procedure as described in paragraph (3)(B), and evaluated according to five-rank criteria based on the number of remaining squares to determine its boiling resistant adhesion index. Rank 5 or more indicates very high boiling resistant adhesiveness, rank 4 or more indicating good, rank 3 or 2 indicating practically good, and rank 1 indicating inferior boiling resistant. The boiling test was performed under severer conditions than the high-temperature, high-humidity test, and therefore, even a specimen evaluated as rank 1 has a practically good quality if evaluated as rank 3 or higher in the high-temperature, high-humidity test specified in paragraph (4)(A).

5: 100/100 (number of remaining squares/number of observed squares)
4: 90/100 or more, less than 100/100
3: 80/100 or more, less than 90/100
2: 50/100 or more, less than 80/100
1: less than 50/100.

(5) Interference Fringes

Substantially the same procedure as described in (3) was carried out to provide a hard coat film containing an ultraviolet absorber. A specimen with a size of 8 cm (in the width direction of the laminated polyester film)×10 cm (in the length direction of the laminated polyester film) was cut out of the resulting hard coat film, and a black glossy tape (Vinyl Tape No. 200-50-21, black, supplied by Yamato Co., Ltd.) was pasted to the opposite surface of the hard coat layer in such a manner that bubbles would not form. This specimen was placed 30 cm directly below a three band fluorescent lamp (three band type neutral white (F•L 15EX-N 15 W), supplied by Matsushita Electric Industrial Co., Ltd.) in a darkroom and the degree of interference fringes was observed visually from different viewing angles and evaluated as described below. A practically acceptable specimen was ranked as B and, accordingly, a specimen ranked as A or higher had good quality. For the interference fringe test, specimens were sampled from a hard coat film by the same procedures as described in paragraph (1)(A). Specimens were evaluated according to the following criteria, and those ranked as B or higher were assumed to be acceptable.

S: Substantially no interference fringe is visible.
A: Interference fringes are slightly visible.
B: Weak interference fringes are visible.
C: Strong interference fringes are visible.

(6) Wetting Tension on Surface of Lamination Layer (Layer C)

The laminated polyester film was cured for 24 hours under the conditions of a temperature of 23° C. and relative humidity of 65%. Subsequently, the wetting tension was measured according to JIS K6768 (1999).

(7) TOF-SIMS Analysis of Lamination Layer (layer C)

Analysis of the sulfonic acid group and carboxylic acid group in the lamination layer (layer C) was carried out based on the negative secondary ion peak strength measured by time-of-flight secondary ion mass spectrometry (TOF-SIMS) using the undermentioned equipment under the undermentioned conditions.

Equipment
  equipment: TOF.SIMS5 (supplied by ION-TOF)
  primary ion: $Bi_3^{++}$, primary ion energy: 25 kV
  secondary ion polarity: negative
  post-acceleration: 10 kV
  degree of vacuum for measurement: $4 \times 10^{-7}$ Pa
  pulse width: 9.0 ns
  raster size: 300 μm□
  number of scans: 16 scans
  number of pixels: 256 pixels
  range of mass (m/z): 0 to 1,500

Analysis Procedure

The peak strength measurements of the negative secondary ion species of $CHO_2^-$ (m/z 45.00, derived from carboxylic acid group) and $SO_3^-$ (m/z 79.96, derived from sulfonic acid group) were divided by the total peak strength value obtained from the negative secondary ion strength analysis to provide a normalized value (ratio relative to the overall negative secondary ion strength).

Methods for preparing resins and the like used in Examples and Comparative Examples are described in Reference Examples below.

Reference Example 1

Preparation of Polyester Resin (A1)

In a nitrogen gas atmosphere, 88 parts by mole of 2,6-naphthalene dicarboxylic acid as dicarboxylic acid component, 6 parts by mole of sodium 5-sulfoisophthalate, and 100 parts by mole of ethylene glycol as glycol component were fed to an ester interchange reaction vessel, and then, tetrabutyl titanate (catalyst) was added in an amount of 100 parts by weight relative to 1,000,000 parts by weight of the total dicarboxylic acid component, followed by esterification reaction at 160 to 240° C. for 5 hours and removal of the distillate.

Subsequently, 6 parts by mole of trimellitic acid as the tri- or higher-valent, carboxylic acid component and additional 100 parts by weight of tetrabutyl titanate relative to 1,000,000 parts by weight of the total dicarboxylic acid component were added, and removal of the distillate was continued at 240° C. until the reactant became transparent, followed by carrying out condensation polymerization reaction at 220 to 280° C. under reduced pressure to provide polyester resin (A1). The polyester resin had a Tg of 120° C.

Then, 531.6 parts by weight of water, 2.0 parts by weight of 25 wt % aqueous ammonia, and 33.4 parts by weight of butyl cellosolve were added to 100.0 parts by weight of the aforementioned polyester resin (A1) and dissolved at 40° C. Subsequently, the reaction container was closed tight, and the internal temperature of the container was raised to 120° C., followed by heating for 2 hours to provide a water dispersion of polyester resin (A1).

<Constitution of Polyester Resin (A1)> Total Monomer Quantity Accounting for 100 Parts by Mole (Dicarboxylic Acid Component and Multivalent Carboxylic Acid Component)
  2,6-naphthalene dicarboxylic acid: 44 parts by mole
  sodium 5-sulfoisophthalate: 3 parts by mole
  1,3,5-trimellitic acid: 3 parts by mole
glycol component)
  ethylene glycol: 50 parts by mole Reference Example 2

Preparation of Polyester Resin (A2)

In a nitrogen gas atmosphere, 80 parts by mole of dimethyl 2,6-naphthalenedicarboxylate as dicarboxylic acid component, 10 parts by mole of sodium 5-sulfoisophthalate, 80 parts by mole of 9,9-bis[4-(2-hydroxyethoxy)phenyl] fluorene and 20 parts by mole of ethylene glycol as glycol components were fed to an ester interchange reaction vessel, and then, tetrabutyl titanate (catalyst) was added in an amount of 100 parts by weight relative to 1,000,000 parts by weight of the total dicarboxylate derivatives, followed by esterification reaction at 160 to 200° C. for 5 hours and distillation of methanol. The reaction was further continued for 30 minutes at 240° C. under a reduced pressure of 0.2 MPa to provide polyester polyol.

Then, 10 parts by mole of 1,3,5-trimellitic acid, which is a multivalent, i.e., tri- or higher-valent, carboxylic acid component, was added to the polyester polyol and reacted for 3 hours at a reaction temperature of 160 to 180° C. to provide polyester resin (A2). The polyester resin had a Tg of 135° C.

Then, 100 parts by weight of the aforementioned fluorene-copolymerized polyester resin (A2) and 400 parts by weight of tetrahydrofuran were mixed and heated at 80° C. to ensure dissolution, followed by adding 500 parts by weight of water at 80° C. to provide a water/tetrahydrofuran based solution of polyester resin (A2). To the resulting water/tetrahydrofuran based solution, 50 parts by weight of butyl cellosolve was added, and tetrahydrofuran was distilled from the resulting solution, followed by cooling and adding water to provide a water dispersion (10% concentration) of polyester resin (A2).

<Constitution of Polyester Resin (A2)> Total Monomer Quantity Accounting for 100 Parts by Mole (Dicarboxylic Acid Component and Multivalent Carboxylic Acid Component)
  2,6-naphthalene dicarboxylic acid: 40 parts by mole
  sodium 5-sulfoisophthalate: 5 parts by mole
  trimellitic acid: 5 parts by mole
glycol component
  9,9-bis[4-(2-hydroxyethoxy) phenyl] fluorene: 40 parts by mole
  ethylene glycol: 10 parts by mole Reference Example 3

Preparation of Polyester Resins (A3 to A5, B1 to B4, and C1 to C2)

Except for mixing components to achieve a constitution as specified in Table 1, the same procedure as in Reference Example 1 was carried out to provide a polyester resin and its water dispersion.

Reference Example 4

Preparation of Acrylic Resin (A2)

In a nitrogen gas atmosphere, 300 parts of water which was to act as solvent under reduced pressure was mixed with 1 part by weight of sodium p-dodecylbenzene sulfonate as emulsifier, together with 65 parts by weight of methyl methacrylate (MMA), 30 parts by weight of ethyl acrylate (EMA), 3 parts by weight of N-methylol acrylamide (N-MAM), and 2 parts by weight of acrylic acid (AA) as monomers in an emulsion polymerization reaction vessel, and to this mixture, sodium persulfate (initiator) was added in an amount of 100 parts by weight relative to 1,000,000 parts by weight of the monomers, followed by carrying out reaction at 30 to 80° C. for 10 hours and adjusting pH to 7.0 to 9.0 using an aqueous ammonia solution (alkali). Subsequently, unreacted monomers were removed at 70° C. under reduced pressure, followed by carrying out condensation to provide a 35% acrylic emulsion. The acrylic emulsion had an average particle diameter of 45 nm and a Tg of 55° C.

<Components of Acrylic Resin>
  methyl methacrylate: 65 parts by weight
  ethyl acrylate: 30 parts by weight
  N-methylol acrylamide: 3 parts by weight
  acrylic acid: 2 parts by weight Reference Example 5

Preparation of Pellets of Polyethylene Terephthalate (PET)

Terephthalic acid and ethylene glycol were used as acid component and glycol component, respectively, and antimony trioxide (polymerization catalyst) was added so that the antimony atom would account for 300 ppm relative to the resulting polyester pellets, and condensation polymerization reaction was carried out to provide pellets of polyethylene terephthalate (PET) having a intrinsic viscosity of 0.63 dl/g and containing 40 equivalents/ton of the carboxyl end group.

Example 1

Pellets of polyethylene terephthalate (intrinsic viscosity of 0.63 dl/g) prepared by carrying out the procedure specified in Reference Example 5 were dried in a vacuum at 160° C. for 4 hours, supplied to an extruder, and melt-extruded at 285° C. The extrudate was filtered through a filter with an average opening size of 5 μm produced by sintering and compressing stainless steel fiber and another filter with an average opening size of 14 μm produced by sintering stainless steel powder, extruded from a T-die into a sheet, brought into contact with a mirror finished casting drum with a surface temperature of 20° C. by the electrostatic casting technique, and solidified by cooling. During this step, both of the film surfaces were cooled by cool air at a temperature of 10° C. supplied at a speed of 20 m/s from the opposite surface of the casting drum through eight slit nozzles, each with a gap of 2 mm, aligned in the length direction.

This unstretched film was preheated at 70° C. by preheating rolls, heated at 90° C. from above and below using radiant heaters while being stretched 3.1 times in the length direction by virtue of the difference in circumferential speed among the rolls, and immediately cooled to 25° C. by cooling rolls to provide a uniaxially oriented (uniaxially stretched) film. Both surfaces of this film were subjected to corona discharge treatment in air to adjust the film's surface tension to 55 mN/m.

Subsequently, a lamination layer (layer C) was formed by coating both surfaces of the aforementioned uniaxially stretched film with the undermentioned coating liquid using a bar coater. The metering wire bar had a diameter of 13 mm and wire diameter of 0.1 mm (#4).

Coating Liquid

An aqueous solution of polyester resin having a content of 5.0% in terms of solid weight and containing the following components relative to the total weight of solid polyester resin which accounts for 100 parts by weight.
  polyester resin (A1): 40 parts by weight
  polyester resin (B1): 60 parts by weight
  melamine based crosslinking agent (Nikalac MW12LF, supplied by Sanwa Chemical Co., Ltd.): 40 parts by weight (in terms of solid weight)
  oxazoline based crosslinking agent (Epocros WS500, supplied by Nippon Shokubai Co., Ltd.): 10 parts by weight (in terms of solid weight)
  colloidal silica with a particle diameter of 140 nm: 1.5 parts by weight A uniaxially stretched film prepared by coating a lamination layer (layer C) was held by clips, dried and preheated in an oven at an air temperature of 120° C., and immediately stretched 3.7 times in the width direction in a stretching zone at 120° C. The resulting biaxially orientated (biaxially stretched) film was subjected to heat treatment for 10 seconds in a heating zone at 230° C., and subjected to 5% relaxation treatment while being cooled from 230° C. to 120° C., followed by cooling to 50° C. Subsequently, both widthwise edges were removed, and the film was wound up to provide a laminated polyester film consisting of a polyester base film (layer S) laminated with a lamination layer (layer C) and having a thickness of 188 μm and haze of 0.9% (JIS K7105 (1981)). Characteristics of the resulting laminated polyester film are shown in Table 3. It had a high initial adhesive strength to the hard coat layer having an ultraviolet ray absorption layer, as well as high durability and insignificant interference fringes (average undulation amplitude) and in particular, it was excellent in terms of initial adhesive strength and interference-fringe-free curing and suitable as hard coat film. Incidentally, a hard coat film prepared by forming a hard coat containing an ultraviolet absorber over the laminated polyester film produced in Example 1 according to the procedure described in paragraph (3)(A)(b) under "Methods for measurement of properties" had a transmittance of 50% at a wavelength of 380 nm.

Examples 2 to 26 and Comparative Examples 1 to 9

Except that the constitution of the lamination layer (layer C) was as described in Table 2, a laminated polyester film was prepared according to Example 1. Characteristics of the resulting laminated polyester film are shown in Table 3. The coating material concentration was 4.6% in Example 19, and the coating material concentration was 5.4% in Example 20. Furthermore, the material for the polyester base film (layer S) used in Example 21 was prepared by adding 2,2'-(1,4-phenylene)-bis(4H-3,1-benzoxazine-4-one), as ultraviolet absorber, up to a content of 0.5 wt % to the polyethylene terephthalate resin described in Example 1.

Adhesiveness

The lamination layer (layer C) was formed of a polyester resin containing a sulfonic acid component, and the surface of the lamination layer (layer C) had a wetting tension in the range of 35 to 45 mN/m. The wet-heat-resistant adhesion index to a hard coat layer containing an ultraviolet absorber was in the acceptable range of 3 or more and 5 or less.

Furthermore, in the cases where polyesters (A) with glass transition temperatures (Tg) of 110 to 140° C. and polyesters (B) with glass transition temperatures (Tg) of 40 to 90° C. were mixed at ratios of 10/90 to 60/40 while both polyesters (A) and polyesters (B) incorporated a monomer containing a sulfonic acid component and a monomer containing a multivalent, i.e., tri- or higher-valent, carboxylic acid component, the resulting film had a still better initial adhesiveness and wet-heat resistant adhesiveness (durability of adhesion). The films prepared in Exampled 24 to 26 were outside the range and ranked as 3 for wet-heat-resistant adhesion index, i.e., the lowest acceptable level for practical use. Particularly excellent results were obtained for the initial adhesiveness and wet-heat resistant adhesiveness (durability of adhesion) in the following case: polyesters (A) and polyesters (B) were mixed at a ratio of 30/70 to 50/50; in polyesters (A), the monomers containing a sulfonic acid component accounted for a content (SA) of 3 to 5 parts by mole, while the monomers containing a multivalent, i.e., tri- or higher-valent, carboxylic acid component accounted for a content (CA) of 3 to 8 parts by mole; in polyesters (B), the monomers containing a sulfonic acid component accounted for a content (SB) of 3 to 5 parts by mole, while the monomers containing a multivalent, i.e., tri- or higher-valent, carboxylic acid component accounted for a content (CB) of 3 to 8 parts by mole; a melamine based and/or oxazoline based crosslinking agent accounted for 30 to 60 parts by weight; and the surface of the lamination layer (layer C) had a wetting tension of 36 to 43 mN/m. (Examples 1, 3, 9, 10, 13-20, 22, and 23)

It is considered that the existence of a sulfonic acid component in the polyester resin works to increase the hydrophilicity of the resin and has good effect on its initial adhesive strength, and when compared with the sulfonic acid component, the carboxylic acid component has only a small contribution to improvement of the initial adhesive strength but develops high wet-heat resistant adhesiveness (durability of adhesion). Accordingly, it is expected that in addition to ensuring hydrophilicity, its existence in an appropriate amount as described above ensures both initial adhesive strength and wet-heat resistant adhesiveness (durability of adhesion) in a good balance, leading to the development of a particularly high adhesiveness. As regards the normalized values of secondary ion strength measurements attributed to the sulfonic acid component and carboxylic acid component, the preferable range is $0.2 \times 10^{-2}$ to $2.0 \times 10^{-2}$ for $SO_3^-$ and $0.3 \times 10^{-2}$ to $1.5 \times 10^{-2}$ for $CHO_2^-$ and, accordingly, the films prepared in Comparative Examples 1, 2, 5, 6, 7, 9 were outside our ranges and inferior in wet-heat resistant adhesiveness.

Furthermore, as regards the two groups of polyesters that differ in glass transition temperature (Tg), it is considered that polyesters (A), which have relatively high glass transition temperatures (Tg), suffer little fluctuations in molecular structure even in a high-temperature, high-humidity environment and accordingly have relations with the durability of adhesion, while polyesters (B), which have relatively low glass transition temperatures (Tg), exhibit high molecular mobility and accordingly have strong relations with the initial adhesive strength.

The film in Comparative Example 1, which does not include polyesters (B), is inferior in initial adhesiveness, while the film in Comparative Example 8, which contains polyester C1 which is lower in glass transition temperature (Tg) than polyesters (B), is inferior in wet-heat resistant adhesiveness. The film in Example 24, in which polyesters (B) contain no sulfonic acid component, tends to be inferior in initial adhesiveness, while the film in Example 6, in which its content is small, is slightly smaller in initial adhesiveness than in Example 1. On the other hand, the films are high in initial adhesiveness but inferior in wet-heat resistant adhesiveness in Comparative Examples 2 and 4 in which polyesters (A) are not contained and in Comparative Examples 3 and 6 in which the polyesters contain a larger amount of the sulfonic acid component and has a wetting tension of 45 mN/m or more. Furthermore, the durability tends to decrease also in Example 26 in which polyesters (A) contain no sulfonic acid component and in Example 25 in which no carboxylic acid component is contained. This may arise from the fact that adequate initial adhesiveness and moist heat resistance do not exist between the components of polyesters (A) that develop mainly wet-heat resistant adhesiveness and the hard coat layer, and it is preferable that polyesters (A) contains both a sulfonic acid component and a carboxylic acid component.

Furthermore, the wet-heat resistant adhesiveness is further improved in Examples 13-16 in which the lamination layer (layer C) contains 5 to 30 parts by weight of acrylic based resin. This is because the local densities of the acrylic resin component and the polyester resin component, i.e., the primary component, existing in the lamination layer (layer C) vary along the thickness direction of the lamination layer (layer C) and, accordingly, acrylic resin components that have a poor hydrophilicity but a higher adhesiveness to the hard coat layer exist in a larger amount at the surface that constitutes the interface with the hard coat layer. It is considered that the existence of this structural feature in the lamination film serves to reduce the reflected light from the interface with the hard coat layer and prevent the deterioration of interference fringes.

Interference Fringes

Acceptable results were obtained when the lamination layer (layer C) had a minimum surface reflectance, λmin, at 500 to 600 nm, and particularly good results were obtained when it is at 530 to 570 nm. In Examples 19 and 20, results were near an end of the acceptable range, with interference fringes being deteriorated to the lowest limit of acceptable range. Results were in the acceptable range when reflectance Rmin at wavelength λmin was 4.0 to 6.0%, and good results were obtained when it is 4.8 to 5.3%. In Comparative Example 1, the films were outside this range and gave severe interference fringes of an unacceptable level, while in Examples 4, 5, and 14, and Comparative Examples 2 and 7, the films were near the limit and gave stronger interference fringes compared to the films in the excellent range although they were at an acceptable level.

Ultraviolet Ray Absorbability

In Example 21, the polyester base film (layer S) contained an ultraviolet absorber, and consequently, the hard coat film composed of a laminated polyester film laminated with a hard coat containing an ultraviolet absorber prepared in Example 21 according paragraph (3)(A)(b) had an extremely low transmittance of less than 0.1% at an wavelength of 380 nm. in the resulting hard coat film, all layers constituting the film, that is, the hard coat layer, laminated polyester film layer, and members protected by the hard coat film had high durability against ultraviolet rays.

TABLE 1

|  |  | polyester A1 | polyester A2 | polyester A3 | polyester A4 | polyester A5 |
|---|---|---|---|---|---|---|
| dicarboxylic acid component |  |  |  |  |  |  |
| 2,6-naphthalene dicarboxylic acid |  | 44 parts by mole | 40 parts by mole | 35 parts by mole | 44 parts by mole | 38 parts by mole |
| terephthalic acid |  | — | — | 9 parts by mole | — | — |
| isophthalic acid |  | — | — | — | — | — |
| 5-sulfoisophthalic acid sodium | (containing sulfonic acid group) | 3 parts by mole | 5 parts by mole | 3 parts by mole | 6 parts by mole | — |
| 1,3,5-trimellitic acid | (containing tri- or higher-valent carboxylic acid group) | 3 parts by mole | 5 parts by mole | 3 parts by mole | — | — |
| 1,2,4,5-benzene tetracarboxylic acid | (containing tri- or higher-valent carboxylic acid group) | — | — | — | — | 12 parts by mole |
| glycol component |  |  |  |  |  |  |
| ethylene glycol |  | 50 parts by mole | 10 parts by mole | 50 parts by mole | 50 parts by mole | 40 parts by mole |
| diethylene glycol |  | — | — | — | — | — |
| neopentyl glycol |  | — | — | — | — | — |
| 9,9-bis[4-(2-hydroxyethoxy) phenyl] fluorene |  | — | 40 parts by mole | — | — | 10 parts by mole |
| glass transition temperature (Tg) |  | 120° C. | 135° C. | 110° C. | 120° C. | 120° C. |

|  |  | polyester B1 | polyester B2 | polyester B3 | polyester B4 | polyester C1 | polyester C2 |
|---|---|---|---|---|---|---|---|
| dicarboxylic acid component |  |  |  |  |  |  |  |
| 2,6-naphthalene dicarboxylic acid |  | — | — | — | — | — | 40 parts by mole |
| terephthalic acid |  | 44 parts by mole | 40 parts by mole | 44 parts by mole | 42 parts by mole | — | — |
| isophthalic acid |  | — | — | — | — | 44 parts by mole | — |
| 5-sulfoisophthalic acid sodium | (sulfonic acid group containing) | 3 parts by mole | 5 parts by mole | 6 parts by mole | — | 3 parts by mole | 5 parts by mole |
| 1,3,5-trimellitic acid | (containing tri- or higher-valent carboxylic acid group) | 3 parts by mole | 5 parts by mole | — | 8 parts by mole | 3 parts by mole | 5 parts by mole |
| 1,2,4,5-benzene tetracarboxylic acid | (containing tri- or higher-valent carboxylic acid group) | — | — | — | — | — | — |
| glycol component |  |  |  |  |  |  |  |
| ethylene glycol |  | 30 parts by mole | 25 parts by mole | 50 parts by mole | 50 parts by mole | 50 parts by mole | 30 parts by mole |
| diethylene glycol |  | — | — | — | — | — | — |
| neopentyl glycol |  | 20 parts by mole | 25 parts by mole | — | — | — | 20 parts by mole |
| 9,9-bis[4-(2-hydroxyethoxy) phenyl] fluorene |  | — | — | — | — | — | — |
| glass transition temperature (Tg) |  | 60° C. | 50° C. | 82° C. | 75° C. | 38° C. | 100° C. |

TABLE 2

|  |  | polyester (A) group ||||| polyester (B) group |||||
|---|---|---|---|---|---|---|---|---|---|---|
|  | Type | glass transition temperature (Tg) (° C.) | mixing ratio (parts by weight) | monomer containing sulfonic acid component SA (parts by mole) | monomer containing tri- or higher-valent carboxylic acid component CA (parts by mole) | type | glass transition temperature (Tg) (° C.) | mixing ratio (parts by weight) | monomer containing sulfonic acid component SB (parts by mole) | monomer containing tri- or higher-valent carboxylic acid component CB (parts by mole) |
| Example 1 | polyester A1 | 120 | 40 | 3 | 3 | polyester B1 | 60 | 60 | 3 | 3 |
| Example 2 | polyester A1 | 120 | 40 | 3 | 3 | polyester B2 | 50 | 60 | 5 | 5 |
| Example 3 | polyester A1 | 120 | 40 | 3 | 3 | polyester B3 | 82 | 30 | 3 | 4 |
|  |  |  |  |  |  | polyester B4 | 75 | 30 |  |  |
| Example 4 | polyester A1 | 120 | 10 | 3 | 3 | polyester B1 | 60 | 90 | 3 | 3 |
| Example 5 | polyester A1 | 120 | 60 | 3 | 3 | polyester B1 | 60 | 40 | 3 | 3 |

TABLE 2-continued

| | | polyester (A) group | | | | polyester (B) group | | | | |
|---|---|---|---|---|---|---|---|---|---|---|
| | type | glass transition temperature (Tg) (° C.) | mixing ratio (parts by weight) | monomer containing sulfonic acid component SA (parts by mole) | monomer containing tri- or higher-valent carboxylic acid component CA (parts by mole) | type | glass transition temperature (Tg) (° C.) | mixing ratio (parts by weight) | monomer containing sulfonic acid component SB (parts by mole) | monomer containing tri- or higher-valent carboxylic acid component CB (parts by mole) |
| Example 6 | polyester A1 | 120 | 40 | 3 | 3 | polyester B3 | 82 | 10 | 1 | 6.7 |
| | | | | | | polyester B4 | 75 | 50 | | |
| Example 7 | polyester A1 | 120 | 40 | 3 | 3 | polyester B3 | 82 | 50 | 5 | 1.3 |
| | | | | | | polyester B4 | 75 | 10 | | |
| Example 8 | polyester A2 | 135 | 30 | 5 | 5 | polyester B1 | 60 | 70 | 3 | 3 |
| Example 9 | polyester A3 | 110 | 40 | 3 | 3 | polyester B1 | 60 | 60 | 3 | 3 |
| Example 10 | polyester A4 | 120 | 20 | 3 | 6 | polyester B1 | 60 | 60 | 3 | 3 |
| | polyester A5 | 120 | 20 | | | | | | | |
| Example 11 | polyester A4 | 120 | 10 | 1.5 | 9 | polyester B1 | 60 | 60 | 3 | 3 |
| | polyester A5 | 120 | 30 | | | | | | | |
| Example 12 | polyester A4 | 120 | 35 | 5.25 | 1.5 | polyester B1 | 60 | 60 | 3 | 3 |
| | polyester A5 | 120 | 5 | | | | | | | |
| Example 13 | polyester A1 | 120 | 40 | 3 | 3 | polyester B1 | 60 | 60 | 3 | 3 |
| Example 14 | polyester A1 | 120 | 40 | 3 | 3 | polyester B1 | 60 | 60 | 3 | 3 |
| Example 15 | polyester A2 | 135 | 30 | 5 | 5 | polyester B1 | 60 | 70 | 3 | 3 |
| Example 16 | polyester A2 | 135 | 50 | 5 | 5 | polyester B1 | 60 | 50 | 3 | 3 |
| Example 17 | polyester A1 | 120 | 30 | 3 | 3 | polyester B1 | 60 | 60 | 3 | 3 |

| | polyester (C) group (other polyester) | | | | other component | | | |
|---|---|---|---|---|---|---|---|---|
| | Type | glass transition temperature (Tg) (° C.) | mixing ratio (parts by weight) | monomer containing sulfonic acid component SC (parts by mole) | monomer containing tri- or higher-valent carboxylic acid component CC (parts by mole) | acrylic resin (parts by weight) | melamine crosslinking agent (parts by weight) | oxazoline based crosslinking agent (parts by weight) | inorganic particles (parts by weight) |
| Example 1 | — | — | — | — | — | — | 40 | 10 | 1.5 |
| Example 2 | — | — | — | — | — | — | 40 | 10 | 1.5 |
| Example 3 | — | — | — | — | — | — | 40 | 10 | 1.5 |
| Example 4 | — | — | — | — | — | — | 40 | 10 | 1.5 |
| Example 5 | — | — | — | — | — | — | 40 | 10 | 1.5 |
| Example 6 | — | — | — | — | — | — | 40 | 10 | 1.5 |
| Example 7 | — | — | — | — | — | — | 40 | 10 | 1.5 |
| Example 8 | — | — | — | — | — | — | 40 | 10 | 1.5 |
| Example 9 | — | — | — | — | — | — | 40 | 10 | 1.5 |
| Example 10 | — | — | — | — | — | — | 40 | 10 | 1.5 |
| Example 11 | — | — | — | — | — | — | 40 | 10 | 1.5 |
| Example 12 | — | — | — | — | — | — | 40 | 10 | 1.5 |
| Example 13 | — | — | — | — | — | 5 | 40 | 10 | 1.5 |
| Example 14 | — | — | — | — | — | 20 | 40 | 10 | 1.5 |
| Example 15 | — | — | — | — | — | 10 | 40 | 10 | 1.5 |
| Example 16 | — | — | — | — | — | 30 | 40 | 10 | 1.5 |
| Example 17 | polyester C1 | 38 | 10 | 3 | 3 | — | 40 | 10 | 1.5 |

| | | polyester (A) group | | | | polyester (B) group | | | | |
|---|---|---|---|---|---|---|---|---|---|---|
| | type | glass transition temperature (Tg) (° C.) | mixing ratio (parts by weight) | monomer containing sulfonic acid component SA (parts by mole) | monomer containing tri- or higher-valent carboxylic acid component CA (parts by mole) | type | glass transition temperature (Tg) (° C.) | mixing ratio (parts by weight) | monomer containing sulfonic acid component SB (parts by mole) | monomer containing tri- or higher-valent carboxylic acid component CB (parts by mole) |
| Example 18 | polyester A1 | 120 | 30 | 3 | 3 | polyester B1 | 60 | 60 | 3 | 3 |
| Example 19 | polyester A1 | 120 | 40 | 3 | 3 | polyester B1 | 60 | 60 | 3 | 3 |
| Example 20 | polyester A1 | 120 | 40 | 3 | 3 | polyester B1 | 60 | 60 | 3 | 3 |
| Example 21 | polyester A1 | 120 | 40 | 3 | 3 | polyester B1 | 60 | 60 | 3 | 3 |
| Example 22 | polyester A1 | 120 | 40 | 3 | 3 | polyester B1 | 60 | 60 | 3 | 3 |
| Example 23 | polyester A1 | 120 | 40 | 3 | 3 | polyester B1 | 60 | 60 | 3 | 3 |
| Example 24 | polyester A1 | 120 | 30 | 3 | 3 | polyester B4 | 75 | 70 | 0 | 8 |
| Example 25 | polyester A4 | 120 | 40 | 6 | 0 | polyester B1 | 60 | 60 | 3 | 3 |
| Example 26 | polyester A5 | 120 | 40 | 0 | 12 | polyester B1 | 60 | 60 | 3 | 3 |
| Comparative Example 1 | polyester A5 | 120 | 100 | 0 | 12 | — | — | — | — | — |
| Comparative Example 2 | — | — | — | — | — | polyester B3 | 82 | 100 | 6 | 0 |
| Comparative Example 3 | polyester A1 | 120 | 40 | 3 | 3 | polyester B3 | 82 | 60 | 6 | 0 |
| Comparative Example 4 | — | — | — | — | — | polyester B1 | 60 | 60 | 3 | 3 |
| Comparative Example 5 | polyester A5 | 120 | 40 | 0 | 12 | polyester B4 | 75 | 60 | 0 | 8 |
| Comparative | polyester A4 | 120 | 40 | 6 | 0 | polyester B3 | 82 | 60 | 6 | 0 |

TABLE 2-continued

| | | | | | | | | | | |
|---|---|---|---|---|---|---|---|---|---|---|
| Example 6 | | | | | | | | | | |
| Comparative Example 7 | polyester A5 | 120 | 40 | 0 | 12 | polyester B4 | 75 | 60 | 0 | 8 |
| Comparative Example 8 | polyester A4 | 120 | 40 | 6 | 0 | — | — | — | — | — |
| Comparative Example 9 | polyester A4 | 120 | 10 | 6 | 0 | polyester B4 | 75 | 90 | 0 | 8 |

| | polyester (C) group (other polyester) | | | | other component | | | |
|---|---|---|---|---|---|---|---|---|
| | Type | glass transition temperature (Tg) (° C.) | mixing ratio (parts by weight) | monomer containing sulfonic acid component SC (parts by mole) | monomer containing tri- or higher-valent carboxylic acid component CC (parts by mole) | acrylic resin (parts by weight) | melamine crosslinking agent (parts by weight) | oxazoline based crosslinking agent (parts by weight) | inorganic particles (parts by weight) |
| Example 18 | polyester C2 | 100 | 10 | 5 | 5 | — | 40 | 10 | 1.5 |
| Example 19 | — | — | — | — | — | — | 40 | 10 | 1.5 |
| Example 20 | — | — | — | — | — | — | 40 | 10 | 1.5 |
| Example 21 | — | — | — | — | — | — | 20 | — | 1.5 |
| Example 22 | — | — | — | — | — | 10 | 40 | — | 1.5 |
| Example 23 | — | — | — | — | — | — | 40 | 10 | 1.5 |
| Example 24 | — | — | — | — | — | — | 40 | 10 | 1.5 |
| Example 25 | — | — | — | — | — | — | 40 | 10 | 1.5 |
| Example 26 | — | — | — | — | — | — | 40 | 10 | 1.5 |
| Comparative Example 1 | — | — | — | — | — | — | 40 | 10 | 1.5 |
| Comparative Example 2 | — | — | — | — | — | — | 40 | 10 | 1.5 |
| Comparative Example 3 | — | — | — | — | — | — | 40 | 10 | 1.5 |
| Comparative Example 4 | polyester C2 | 100 | 40 | 5 | 5 | — | 40 | 10 | 1.5 |
| Comparative Example 5 | — | — | — | — | — | — | 40 | 10 | 1.5 |
| Comparative Example 6 | — | — | — | — | — | — | 40 | 10 | 1.5 |
| Comparative Example 7 | — | — | — | — | — | 20 | 40 | 10 | 1.5 |
| Comparative Example 8 | polyester C1 | 38 | 60 | 3 | 3 | — | 40 | 10 | 1.5 |
| Comparative Example 9 | — | — | — | — | — | — | 40 | 10 | 1.5 |

TABLE 3

| | | | | | | hard coat free of ultraviolet absorber | | | hard coat containing ultraviolet absorber | | |
|---|---|---|---|---|---|---|---|---|---|---|---|
| | | | | | | adhesive strength | | | adhesive strength | | |
| | wetting tension on lamination layer surface (mN/m) | minimum reflectance on lamination layer surface Rmin (%) | wavelength for minimum reflectance λmin (nm) | TOF-SIMS analysis of lamination film | | high temperature high humidity test | | | high temperature high humidity test | | |
| | | | | $SO_3^-$ normalized ($\times 10^{-2}$) | $CHO_2^-$ normalized ($\times 10^{-2}$) | (wet-heat-resistant adhesion index) initial | boiling test | interference fringes | (wet-heat-resistant adhesion index) initial | boiling test | interference fringes |
| Example 1 | 42 | 5.2% | 540 nm | 0.98 | 0.66 | 5 | 5 | 5 | S | 5 | 5 | 4 | S |
| Example 2 | 45 | 5.1% | 545 nm | 1.35 | 0.79 | 5 | 5 | 4 | S | 5 | 3 | 2 | S |
| Example 3 | 43 | 5.1% | 540 nm | 0.96 | 0.73 | 5 | 5 | 5 | S | 5 | 5 | 4 | S |
| Example 4 | 42 | 4.4% | 553 nm | 0.97 | 0.64 | 5 | 5 | 4 | B | 5 | 4 | 3 | B |
| Example 5 | 42 | 5.7% | 545 nm | 0.97 | 0.65 | 5 | 5 | 5 | B | 4 | 4 | 4 | B |
| Example 6 | 41 | 5.1% | 540 nm | 0.58 | 0.91 | 5 | 5 | 5 | S | 4 | 4 | 4 | S |
| Example 7 | 44 | 5.2% | 540 nm | 1.33 | 0.54 | 5 | 5 | 4 | S | 5 | 3 | 2 | S |
| Example 8 | 43 | 5.4% | 550 nm | 1.16 | 0.73 | 5 | 5 | 4 | A | 5 | 4 | 3 | A |
| Example 9 | 42 | 5.1% | 555 nm | 0.96 | 0.69 | 5 | 5 | 5 | S | 5 | 4 | 4 | S |
| Example 10 | 43 | 5.1% | 540 nm | 0.95 | 0.78 | 5 | 5 | 5 | S | 5 | 5 | 4 | S |
| Example 11 | 43 | 5.1% | 545 nm | 0.77 | 0.93 | 5 | 5 | 5 | S | 4 | 4 | 4 | S |
| Example 12 | 43 | 5.2% | 560 nm | 1.26 | 0.59 | 5 | 5 | 5 | S | 5 | 4 | 3 | S |
| Example 13 | 39 | 5.0% | 540 nm | 0.93 | 0.62 | 5 | 5 | 5 | A | 5 | 5 | 4 | A |
| Example 14 | 37 | 4.3% | 535 nm | 0.86 | 0.58 | 5 | 5 | 5 | B | 5 | 5 | 5 | B |
| Example 15 | 38 | 4.9% | 565 nm | 0.91 | 0.68 | 5 | 5 | 5 | S | 5 | 5 | 4 | S |

TABLE 3-continued

| | wetting tension on lamination layer surface (mN/m) | minimum reflectance on lamination layer surface Rmin (%) | wavelength for minimum reflectance λmin (nm) | TOF-SIMS analysis of lamination film | | hard coat free of ultraviolet absorber | | | | hard coat containing ultraviolet absorber | | | |
|---|---|---|---|---|---|---|---|---|---|---|---|---|---|
| | | | | | | adhesive strength | | | | adhesive strength | | | |
| | | | | $SO_3^-$ normalized ($\times 10^{-2}$) | $CHO_2^-$ normalized ($\times 10^{-2}$) | initial | high temperature high humidity test (wet-heat-resistant adhesion index) | boiling test | interference fringes | initial | high temperature high humidity test (wet-heat-resistant adhesion index) | boiling test | interference fringes |
| Example 16 | 36 | 5.0% | 550 nm | 0.54 | 0.43 | 5 | 5 | 5 | S | 5 | 5 | 5 | S |
| Example 17 | 42 | 5.0% | 550 nm | 0.98 | 0.68 | 5 | 5 | 5 | S | 5 | 5 | 4 | S |
| Example 18 | 43 | 5.3% | 540 nm | 1.04 | 0.69 | 5 | 5 | 5 | S | 5 | 5 | 4 | S |
| Example 19 | 42 | 5.1% | 505 nm | 0.95 | 0.63 | 5 | 5 | 5 | B | 5 | 5 | 4 | B |
| Example 20 | 42 | 5.0% | 595 nm | 0.97 | 0.66 | 5 | 5 | 5 | B | 5 | 5 | 4 | B |
| Example 21 | 42 | 4.8% | 530 nm | 1.21 | 0.83 | 5 | 5 | 4 | S | 5 | 3 | 3 | S |
| Example 22 | 42 | 5.0% | 555 nm | 0.97 | 0.66 | 5 | 5 | 5 | S | 5 | 5 | 4 | S |
| Example 23 | 42 | 5.1% | 540 nm | 0.95 | 0.65 | 5 | 5 | 5 | S | 5 | 5 | 4 | S |
| Example 24 | 40 | 4.8% | 550 nm | 0.29 | 1.05 | 4 | 3 | 2 | S | 4 | 3 | 1 | S |
| Example 25 | 44 | 5.2% | 560 nm | 1.37 | 0.52 | 5 | 4 | 2 | S | 5 | 3 | 1 | S |
| Example 26 | 42 | 5.1% | 547 nm | 0.55 | 1.08 | 4 | 4 | 3 | S | 4 | 3 | 2 | S |
| Comparative Example 1 | 41 | 6.1% | 550 nm | undetectable | 1.69 | 3 | 2 | 1 | C | 2 | 1 | 1 | C |
| Comparative Example 2 | 47 | 4.2% | 545 nm | 2.05 | 0.31 | 5 | 2 | 1 | B | 5 | 2 | 1 | B |
| Comparative Example 3 | 46 | 5.1% | 555 nm | 1.55 | 0.47 | 5 | 4 | 3 | S | 5 | 2 | 1 | S |
| Comparative Example 4 | 47 | 5.2% | 545 nm | 1.22 | 0.76 | 5 | 4 | 3 | S | 4 | 2 | 1 | S |
| Comparative Example 5 | 40 | 5.1% | 540 nm | undetectable | 1.40 | 4 | 4 | 3 | S | 2 | 1 | 1 | S |
| Comparative Example 6 | 47 | 5.0% | 545 nm | 2.11 | 0.28 | 5 | 2 | 1 | S | 5 | 1 | 1 | S |
| Comparative Example 7 | 37 | 5.1% | 540 nm | undetectable | 1.23 | 5 | 4 | 3 | S | 5 | 2 | 1 | S |
| Comparative Example 8 | 46 | 5.1% | 550 nm | 1.33 | 0.50 | 5 | 3 | 2 | S | 5 | 2 | 1 | S |
| Comparative Example 9 | 39 | 4.4% | 555 nm | 0.18 | 1.12 | 4 | 3 | 2 | B | 4 | 2 | 1 | B |

INDUSTRIAL APPLICABILITY

The laminated polyester film can develop versatile and durable adhesiveness to hard coat layers with various functions including ultraviolet absorption, and when laminated with a hard coat layer, it further serves to develop good appearance characteristics with suppressed interference fringes. In particular, it develops durable adhesion with a hard coat layer that has an ultraviolet absorption function, thereby serving favorably as touch panel coating film and surface decorating film as well as surface protection film and antireflection film for mobile devices.

The invention claimed is:

1. A laminated polyester film comprising a polyester base film (layer S) with at least one surface laminated with a lamination layer (layer C) containing polyester resin as a primary component, the surface of the lamination layer (layer C) having a wetting tension of 35 to 45 mN/m, and the polyester resin contained in the lamination layer (layer C) meeting requirements (a) to (c):

(a) the lamination layer (layer C) contains polyesters (A) with glass transition temperatures (Tg) of 110 to 140° C. and polyesters (B) with glass transition temperatures (Tg) of 40 to 90° C., (b) at least either polyesters (A) or polyesters (B) contain both a monomer having a sulfonic acid component and a monomer having a tri- or higher-valent, carboxylic acid component, and (c) a mixing ratio between polyesters (A) and polyesters (B) is 10/90 to 60/40 wherein:

the polyesters contained in the lamination layer (layer C) include polyesters (A) with glass transition temperatures (Tg) of 110 to 140° C. and polyesters (B) with glass transition temperatures (Tg) of 40 to 90° C., polyesters (A) and polyesters (B) contain a monomer having a sulfonic acid component and a monomer having a tri- or higher-valent, carboxylic acid component, and equations (d) to (g) below are satisfied, where SA (parts by mole) represents content of the monomers having a sulfonic acid component while CA (parts by mole) represents content of the monomers having a tri- or higher-valent, carboxylic acid component, relative to the total content, which accounts for 100 parts by mole, of all the monomer components contained in polyesters (A), whereas SB (parts by mole) represents content of the monomers having a sulfonic acid component while CB (parts by mole) represents content of the monomers having a tri- or higher-valent, carboxylic acid component, relative to the total content, which accounts 100 parts by mole, of all the monomer components contained in polyesters (B):

$$1 \leq SA \leq 10 \quad \text{equation (d)}$$

$$1 \leq SB \leq 10 \quad \text{equation (e)}$$

$1 \leq CA \leq 10$ equation (f)

$1 \leq CB \leq 10$ equation (g).

2. The laminated polyester film as defined in claim 1, wherein the lamination layer (layer C) contains a melamine based and/or oxazoline based crosslinking agent, the crosslinking agent accounting for 20 to 80 parts by weight relative to the total weight, which accounts 100 parts by weight, of the polyester resins.

3. The laminated polyester film as defined in claim 1, wherein the lamination layer (layer C) contains an acrylic resin, the acrylic resin accounting for 5 to 30 parts by weight relative to the total weight, which accounts for 100 parts by weight, of the polyester resins.

4. The laminated polyester film as defined in claim 1, wherein there exists a wavelength λmin of 500 to 600 nm at which a spectral reflectance curve given by the lamination layer (layer C) surface shows a minimum, the reflectance at λmin, which is represented as Rmin, being 4.0 to 6.0%.

5. A hard coat film comprising laminated polyester film as defined in claim 1, with its lamination layer (layer C) being laminated with a hard coat layer.

6. The laminated polyester film as defined in claim 2, wherein the lamination layer (layer C) contains an acrylic resin, the acrylic resin accounting for 5 to 30 parts by weight relative to the total weight, which accounts for 100 parts by weight, of the polyester resins.

7. A laminated polyester film comprising a polyester base film (layer S) with at least one surface laminated with a lamination layer (layer C) containing a polyester resin as a primary component, the polyester resin in the lamination layer (layer C) containing a monomer with a sulfonic acid component, the surface of the lamination layer (layer C) having a wetting tension of 35 to 45 mN/m, and time-of-flight secondary ion mass spectrometry (TOF-SIMS) of the surface of the lamination layer (layer C) exhibiting normalized intensities in ranges specified below for the undermentioned secondary ion peak species:

$CHO_2^-$: $0.3 \times 10^{-2}$ or more and $1.5 \times 10^{-2}$ or less
$SO_3^-$: $0.2 \times 10^{-2}$ or more and $2.0 \times 10^{-2}$ or less wherein:
the polyesters contained in the lamination layer (layer C) include polyesters (A) with glass transition temperatures (Tg) of 110 to 140° C. and polyesters (B) with glass transition temperatures (Tg) of 40 to 90° C.,
polyesters (A) and polyesters (B) contain a monomer having a sulfonic acid component and a monomer having a tri- or higher-valent, carboxylic acid component, and
equations (d) to (g) below are satisfied, where SA (parts by mole) represents content of the monomers having a sulfonic acid component while CA (parts by mole) represents content of the monomers having a tri- or higher-valent, carboxylic acid component, relative to the total content, which accounts for 100 parts by mole, of all the monomer components contained in polyesters (A), whereas SB (parts by mole) represents content of the monomers having a sulfonic acid component while CB (parts by mole) represents content of the monomers having a tri- or higher-valent, carboxylic acid component, relative to the total content, which accounts 100 parts by mole, of all the monomer components contained in polyesters (B):

$1 \leq SA \leq 10$ equation (d)

$1 \leq SB \leq 10$ equation (e)

$1 \leq CA \leq 10$ equation (f)

$1 \leq CB \leq 10$ equation (g).

8. The laminated polyester film as defined in claim 7, wherein the lamination layer (layer C) contains a melamine based and/or oxazoline based crosslinking agent, the crosslinking agent accounting for 20 to 80 parts by weight relative to the total weight, which accounts 100 parts by weight, of the polyester resins.

9. The laminated polyester film as defined in claim 7, wherein the lamination layer (layer C) contains an acrylic resin, the acrylic resin accounting for 5 to 30 parts by weight relative to the total weight, which accounts for 100 parts by weight, of the polyester resins.

* * * * *